(12) United States Patent
Youngblood et al.

(10) Patent No.: US 12,070,130 B1
(45) Date of Patent: Aug. 27, 2024

(54) BEDDING COMPONENTS INCLUDING FLUID ABSORBING GEL BEADS

(71) Applicant: Youngblood IP Holdings, LLC, Mooresville, NC (US)

(72) Inventors: Tara Youngblood, Mooresville, NC (US); Todd Youngblood, Mooresville, NC (US); G. Peter Macon, Charlotte, NC (US)

(73) Assignee: Youngblood IP Holdings, LLC, Mooresville, NC (US)

( * ) Notice: Subject to any disclaimer, the term of this patent is extended or adjusted under 35 U.S.C. 154(b) by 0 days.

(21) Appl. No.: 18/609,719

(22) Filed: Mar. 19, 2024

(51) Int. Cl.
*A47C 27/08* (2006.01)
*B01J 20/26* (2006.01)
*B01J 20/28* (2006.01)

(52) U.S. Cl.
CPC .......... *A47C 27/086* (2013.01); *A47C 27/085* (2013.01); *A47C 27/088* (2013.01); *B01J 20/261* (2013.01); *B01J 20/28004* (2013.01); *B01J 20/28047* (2013.01); *A47C 27/08* (2013.01)

(58) Field of Classification Search
CPC ... A47C 27/086; A47C 27/085; A47C 27/088; A47C 27/08; B01J 20/261; B01J 20/28004; B01J 20/28047
USPC ...... 5/655.4, 655.5, 644, 654, 702, 909, 911
See application file for complete search history.

(56) References Cited

U.S. PATENT DOCUMENTS

| | | | | |
|---|---|---|---|---|
| 3,456,270 | A * | 7/1969 | Weinstein et al. | A47C 27/081 5/672 |
| 3,600,727 | A * | 8/1971 | Williams | A47C 27/081 5/682 |
| 4,982,465 | A * | 1/1991 | Nagata | A61G 7/05738 5/709 |
| 5,195,196 | A * | 3/1993 | Johenning | A47C 27/085 5/675 |
| 5,210,892 | A * | 5/1993 | Johenning | A47C 27/085 5/682 |
| 5,303,435 | A * | 4/1994 | Haar | A47C 27/18 5/413 R |
| 9,241,581 | B2 | 1/2016 | O'Nion | |
| 11,812,861 | B2 | 11/2023 | Stojanovic et al. | |
| 2005/0187598 | A1 | 8/2005 | Shimizu et al. | |
| 2010/0274332 | A1 | 10/2010 | Hirakawa | |
| 2012/0272675 | A1 | 11/2012 | Hirakawa | |
| 2014/0231280 | A1 | 8/2014 | Chou | |
| 2023/0088072 | A1 | 3/2023 | Stojanovic et al. | |
| 2023/0092044 | A1 * | 3/2023 | Stojanovic | A47C 27/20 |
| 2023/0270263 | A1 | 8/2023 | Stojanovic et al. | |

* cited by examiner

*Primary Examiner* — Robert G Santos
(74) *Attorney, Agent, or Firm* — NEO IP

(57) ABSTRACT

A mattress insert, able to be inserted into a traditional mattress, includes a plurality of compartments, each containing gel beads and water suitable for simulating the feeling, pressure relief, and temperature regulation of a waterbed. The mattress insert is placed into a foam structural material of the mattress, providing the mattress insert with support and preventing the spread of the gel beads within the insert. The foam core of the mattress may be either solid or rounded. This mattress technology and insert is useful for beds, including medical beds and dog beds, recliners, chairs, and sofas.

20 Claims, 16 Drawing Sheets

| 150 |
|---|
| 152 |
| 154 |
| 156 |
| 158 |

FIG. 4

BEDDING COMPONENTS INCLUDING FLUID ABSORBING GEL BEADS

BACKGROUND OF THE INVENTION

1. Field of the Invention

The present invention relates to bedding components, and more specifically to bedding inserts with a gel layer configured to provide advantages associated with the temperature transfer properties and comfort of a waterbed, but with reduced maintenance.

2. Description of the Prior Art

It is generally known in the prior art to provide mattress pads for waterbeds.

Prior art patent documents include the following:

US Patent Pub. No. 2023/0270263 for "FOAM COMFORT LAYER WITH LIQUID PODS AND METHOD OF MAKING SAME" by Stojanovic, filed on Apr. 20, 2023, and published on Aug. 31, 2023, discloses a comfort layer for a bedding or seating product has liquid pods sandwiched between plies of fabric. The plies of fabric are joined with seams, thereby creating pockets, at least one liquid pod being inside each pocket. Each seam joining opposed plies of fabric around each of the liquid pods of the comfort layer may be segmented or solid, depending upon the fabric and type of seam.

US Patent Pub. No. 2023/0088072 for "Pocketed Spring Assembly Including Liquid Pods" by Stojanovic, filed on Sep. 22, 2021, and published on Mar. 23, 2023, discloses a pocketed spring assembly comprises a plurality of parallel strings of springs, each string joined to at least one adjacent string, each string comprising one piece of fabric folded into first and second opposed plies. Outer pockets are formed along each string by transverse seams joining the first and second plies. One pocketed spring and at least one liquid pod are positioned in each outer pocket. At least one cushion pad, at least one liquid pod, or any combination thereof may be individually pocketed inside an outer pocket.

US Patent Pub. No. 2012/0272675 for "HUMAN BODY COOLING APPARATUS," by Hirakawa, filed on Apr. 25, 2012, and published on Nov. 1, 2012, discloses a human body cooling apparatus including an exterior element in which two covering members in a seat shape, each having a front cloth formed of a fabric-like material, and a backing cloth formed of a non-water absorbent material that is weldable by heating are put one upon another. It also includes a cooling medium containing gel internally packed within cooling medium areas continuously formed within the exterior element in areas other than the outer edge welded portion and the plurality of cooling medium excluding portions defined by the partially welded portions in the internal area. An outer edge sealed portion in a rectangular shape is provided by sewing over an outer edge of the exterior element.

US Patent Pub. No. 2010/0274332 for "HUMAN BODY COOLING APPARATUS," by Hirakawa, filed on Nov. 5, 2008, and published on Oct. 28, 2010, discloses a problem to be solved: a third invention providing a human body cooling apparatus which suppresses uneven distribution due to the migratability of a built-in cooling medium, thereby exhibiting a sufficient cooling effect for the body. The human body cooling apparatus 301 pertaining to the third invention includes an exterior element 302 in which two covering members in the shape of a rectangular seat each having a front cloth formed of a material selected from cotton fiber, polyester, rayon, hemp, raised fabric, crepe, striped crepe, towel fabric, and the like, and a backing cloth formed of a non-water absorbent material, such as polyvinyl chloride, or the like, which is weldable by high-frequency heating are put one upon another to provide a flat form, said backing cloths being superposed on each other and the backing cloths being high-frequency welded for formation of an outer edge crimped portion 306, a toric partially crimped portion 307 having an air bleeder hole 308 for heat radiation in a plurality of places in an internal area thereof, and straight-linear middle crimped portions 309; and a cooling medium 305 containing gel, sodium polyacrylate, ammonium sulfate, sodium sulfate, glycerin, water, fungicide, and the like, accommodated in said exterior element 302 such that migration thereof is restricted by said outer edge crimped portion 306, partially crimped portions 307 in the internal area thereof, and middle crimped portions 309; said exterior element 302 being capable of reversible use by front/back reversing it.

US Patent Pub. No. 2005/0187598 for "Mat," by Shimizu, filed on Dec. 1, 2004, and published on Au ust 25, 2005. The present invention provides a mat with multiple filing a chambers charged heat medium and expanded by a pressure of the heat medium, wherein the filling chambers are in parallel and adjacent to each other. The mat of the invention can keep simply and effectively a whole-body or a part of a patient warm or cool and can also prevent bed sores.

U.S. Pat. No. 11,812,861 for "Comfort layer with liquid pods and method of making same," by Stojanovic, filed on Sep. 22, 2021, and published on Nov. 14, 2023, discloses comfort layer for a bedding or seating product has liquid pods sandwiched between plies of fabric. The plies of fabric are joined with seams, thereby creating pockets, at least one liquid pod being inside each pocket. Each seam joining opposed plies of fabric around each of the liquid pods of the comfort layer may be segmented or solid, depending upon the fabric and type of seam.

US Patent Pub. No. 2014/0231280 for "Cold and hot pack capable of being plasticized" by inventor Chou, filed Feb. 10, 2014 and published Aug. 21, 2014, is directed to a cold and hot pack capable of being plasticized comprising: a bag member made of an impermeable soft sealing material; plural particle-like supporters disposed in the bag member, each of the particle-like supporters is formed with at least a pore; and a fluid filled and accommodated in the pores of the particle-like supporters, and a negative pressure status is formed inside bag member, thereby enabling the particle-like supporters and the fluid to be pressed and secured by the atmospheric pressure so as to prevent sag. The present invention is able to be applied in various fields such as a cold and hot pack, a sitting pad, a water bed, an anti-bedsore mattress and a temperature keeping pack, and provides better functions and quality comparing to prior art.

U.S. Pat. No. 9,241,581 for "Adjustable pad" by inventor O'Nion, filed Jul. 2, 2012 and issued Jan. 26, 2016, describes an adjustable pad that can have a substantially level top regardless of the slope or configuration of the surface it is placed upon. The adjustable pad can have a sheet coupled with one or more support members. The support members can be formed or adjusted to account for the slope of the surface. The adjustable pad can be used to change a child's diaper, as a sleeping pad, or for other desired reasons, regardless of the configuration of the surface.

SUMMARY OF TIE INVENTION

The present invention relates to bedding components, and more specifically to bedding components with a gel layer configured to provide advantages associated with the temperature transfer properties and comfort of a waterbed, but with reduced maintenance.

It is an object of this invention to provide bedding components including gel beads for humans and animals, including pillows, pillow inserts, pillow toppers, mattresses, mattress inserts, mattress toppers, weighted blankets, animal and pet beds, and furniture.

In one embodiment, the present invention includes a bedding system, including an insert comprising a plurality of compartments, a tubing system coupled to a water delivery system via a valve, and a foam support structure, wherein the insert is configured to be placed within the foam support structure, wherein each of the plurality of compartments of the insert contains a plurality of gel beads, wherein the plurality of compartments are coupled via dividers, wherein the plurality of gel beads do not traverse dividers, wherein at least one compartment of the plurality of compartments is coupled to the tubing system, wherein the tubing system is contained within the foam support structure, wherein the tubing system comprises a first end coupled to the valve and at least one end coupled to the at least one compartment, wherein the valve is configured to be coupled to a water delivery system, wherein the tubing system is configured to deliver water from the valve to the at least one compartment, and wherein the plurality of gel beads are configured to absorb the water and expand.

In another embodiment, the present invention includes a method of creating a mattress insert, including filling a first compartment with gel beads and filling at least one additional compartment with gel beads, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, connecting a tubing system to the first compartment via a tubing port, wherein the tubing port is configured to receive a first end of the tubing system, feeding the tubing system through a foam support structure and coupling the tubing system to a valve port, the valve port comprises a valve protruding from an external surface of the foam support structure, coupling a water delivery system to the valve, the valve delivering water to the tubing system via the valve port and the tube system delivering the water to the first compartment, the gel beads of the first compartment absorbing the water and expanding.

In yet another embodiment, the present invention includes a bedding system, including an insert comprising a plurality of compartments, a tubing system coupled to a water delivery system via a valve, and a foam support structure, wherein the insert is configured to be placed within the foam support structure, wherein each of the plurality of compartments of the insert contains a plurality of gel beads, wherein the plurality of compartments are coupled via dividers, wherein the dividers are semipermeable, and the plurality of gel beads do not traverse the dividers, wherein at least one compartment of the plurality of compartments is coupled to the tubing system, wherein the tubing system is contained within the foam support structure, wherein the tubing system comprises a first end coupled to the valve, at least one end coupled to the at least one compartment, and at least one additional end coupled to at least one additional compartment of the plurality of compartments, wherein the valve is configured to be coupled to a water delivery system, wherein the tubing system is configured to deliver water from the valve to the at least one compartment, wherein, upon delivery of the water to the at least one compartment, the water traverses the dividers and is dispersed through the plurality of compartments, and wherein the plurality of gel beads are configured to absorb the water and expand.

In one embodiment, the present invention includes a system for simultaneously cooling and supporting the head and neck, including a topper comprising a plurality of compartments, a valve coupled to at least one of the plurality of compartments, and a support structure, wherein the topper is secured to the support structure, wherein each of the plurality of compartments of the topper contains a plurality of gel beads, wherein the plurality of compartments are coupled via dividers, wherein the plurality of gel beads do not traverse dividers, wherein the valve is configured to be coupled to a water delivery system, wherein the valve is configured to deliver water from the water delivery system to the at least one compartment, and wherein the plurality of gel beads are configured to absorb the water and expand.

In another embodiment, the present invention includes a method of creating and implementing a pillow topper to support and cool the head and neck, including preparing the pillow topper, the steps comprising, filling a first compartment with gel beads and filling at least one additional compartment with gel beads, wherein the first compartment is coupled to a valve, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, coupling a water delivery system to the valve, the valve delivering water to the first compartment, and the gel beads of the first compartment absorbing the water and expanding, and securing the pillow to a support structure, wherein the first compartment and/or the at least one additional compartment comprises an elastic fastener which is secured around the support structure.

In yet another embodiment, the present invention includes a system for simultaneously cooling and supporting the head and neck, including a topper comprising a plurality of compartments, a first valve coupled to a water delivery system, a second valve coupled to the water delivery system, and a support structure, wherein the plurality of compartments are subdivided into at least two subunits, wherein a first subunit of the at least two subunits comprises at least two compartments and the at least two compartments are coupled via semi-permeable dividers, wherein the first subunit is coupled to a second subunit of the at least two subunits via an impermeable divider, wherein each of the plurality of compartments of the topper contains a plurality of gel beads, wherein the semi-permeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semi-permeable dividers and is dispersed through the at least two compartments, wherein the plurality of gel beads are configured to absorb the water and expand, and wherein the topper further comprises a first elastic fastener and a second elastic fastener, wherein the first elastic fastener is configured to be secured around a first end of the support structure and the second elastic fastener is configured to be secured around a second end of the support structure.

In one embodiment, the present invention includes a system for providing a therapeutic weight and simultaneously regulating body temperature, including a gel layer including a plurality of compartments, a valve coupled to at least one of the plurality of compartments, and a cloth covering, wherein the gel layer is enclosed within the cloth covering, wherein each of the plurality of compartments of the gel layer contains a plurality of gel beads, wherein the plurality of compartments are coupled via dividers, wherein the plurality of gel beads does not traverse the dividers, wherein at least one compartment of the plurality of compartments is connected to the valve, wherein the valve is configured to be coupled to a water delivery system, wherein the valve is configured to deliver water from the water delivery system to the at least one compartment, and wherein the plurality of gel beads are configured to absorb the water and expand.

In another embodiment, the present invention includes a method of creating a weighted blanket for providing a therapeutic weight and simultaneously regulating body temperature, including preparing a gel layer, the steps including, filling a first compartment with gel beads and filling at least one additional compartment with gel beads, wherein the first compartment is coupled to a valve, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, coupling a water delivery system to the valve, the valve delivering water to the first compartment, and the gel beads of the first compartment absorbing the water and expanding, and enclosing the gel layer in a cloth covering.

In yet another embodiment, the present invention includes a system for providing a therapeutic weight and simultaneously regulating body temperature, including a gel layer including a plurality of compartments, a weighted layer, a first valve coupled to a water delivery system, a second valve coupled to the water delivery system, and a cloth covering, wherein the plurality of compartments are subdivided into at least two subunits, wherein a first subunit of the at least two subunits includes at least two compartments and the at least two compartments are coupled via semi-permeable dividers, wherein the first subunit is coupled to a second subunit of the at least two subunits via an impermeable divider, wherein each of the plurality of compartments of the gel layer contains a plurality of gel beads, wherein the semi-permeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semi-permeable dividers and is dispersed through the at least two compartments, wherein the plurality of gel beads are configured to absorb the water and expand, and wherein the weighted layer is coupled to the gel layer, wherein the first valve and/or the second valve traverses the weighted layer.

In one embodiment, the present invention includes a mattress topper for providing full-body temperature and support during rest, including an insert comprising a plurality of compartments, a valve coupled to at least one of the plurality of compartments, and an elastic cloth comprising an elasticized hem, wherein each of the plurality of compartments of the insert contains a plurality of gel beads, wherein the plurality of compartments are coupled via dividers configured to prevent the plurality of gel beads from traversing the dividers, wherein the valve is configured to be coupled to a water delivery system, wherein the valve, in an open position, is able to configured to allow water from the water delivery system to enter the at least one compartment, wherein the plurality of gel beads are configured to absorb the water and expand, and wherein the insert is coupled to the elastic cloth, wherein the elasticized hem is configured to stretch around a mattress and secure the elastic cloth and the insert to the mattress.

In another embodiment, the present invention includes a method of creating and implementing a mattress topper to support and cool the body, including preparing the mattress topper, the steps comprising, filling a first compartment with gel beads and filling at least one additional compartment with gel beads, wherein the first compartment is coupled to a valve, coupling the first compartment to the at least one additional compartment, via one or more dividers, the one or more dividers preventing the movement of the gel beads from the first compartment to the at least one additional compartment, coupling a water delivery system to the valve, the valve delivering water to the first compartment, and the water diffusing through the first compartment and the at least one additional compartment, the gel beads of the first compartment and the at least one additional compartment absorbing the water and expanding, and securing the mattress topper to a mattress.

In yet another embodiment, the present invention includes a mattress topper for providing full-body temperature and support during rest, including an insert comprising a plurality of compartments, a first valve coupled to a water delivery system, a second valve coupled to the water delivery system, and a cloth covering coupled to at least one elastic fastener, wherein the plurality of compartments are subdivided into at least two subunits, wherein a first subunit of the at least two subunits comprises at least two compartments and the at least two compartments are coupled via semipermeable dividers, wherein the first subunit is coupled to a second subunit of the at least two subunits via an impermeable divider, wherein each of the plurality of compartments of the insert contains a plurality of gel beads, wherein the semi-permeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semipermeable dividers and is dispersed through the at least two compartments, wherein the plurality of gel beads are configured to absorb the water and expand, wherein the cloth covering comprises a pocket configured to receive the insert, wherein the at least one elastic fastener of the cloth covering is configured to be secured around at least a portion of a mattress.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 4 illustrates a side orthogonal view of a mattress including the mattress insert of the present invention.

DETAILED DESCRIPTION

Figure 1:
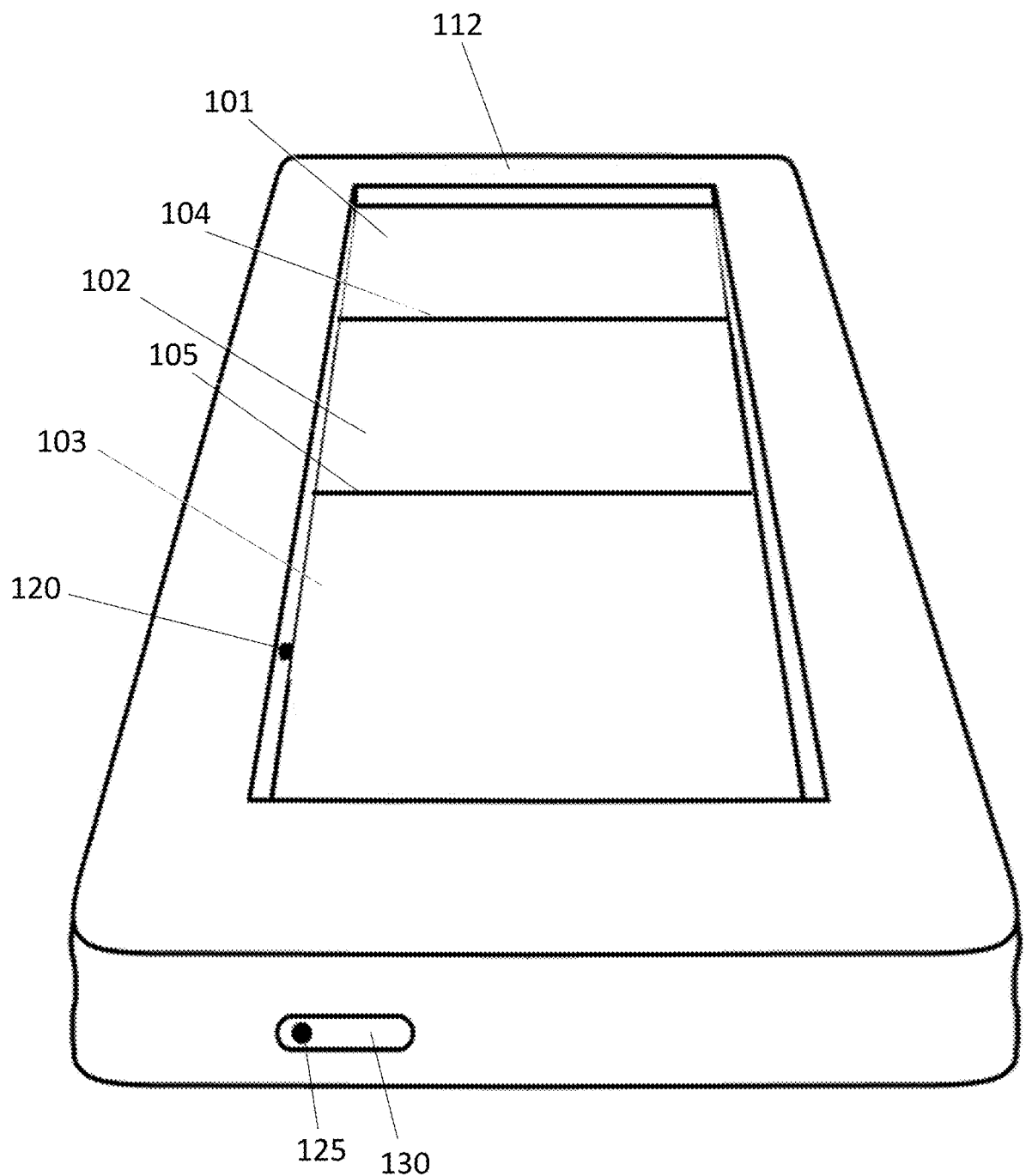
FIG. 1 illustrates a mattress with the mattress insert according to one embodiment of the present invention.

The present invention relates to bedding components, and more specifically to bedding components with a gel layer configured to provide advantages associated with the temperature transfer properties and comfort of a waterbed, but with reduced maintenance.

In one embodiment, the present invention includes a bedding system, including an insert comprising a plurality of compartments, a tubing system coupled to a water delivery system via a valve, and a foam support structure, wherein the insert is configured to be placed within the foam support structure, wherein each of the plurality of compartments of the insert contains a plurality of gel beads, wherein the plurality of compartments are coupled via dividers, wherein the plurality of gel beads do not traverse dividers, wherein at least one compartment of the plurality of compartments is coupled to the tubing system, wherein the tubing system is contained within the foam support structure, wherein the tubing system comprises a first end coupled to the valve and at least one end coupled to the at least one compartment, wherein the valve is configured to be coupled to a water delivery system, wherein the tubing system is configured to deliver water from the valve to the at least one compartment, and wherein the plurality of gel beads are configured to absorb the water and expand.

In another embodiment, the present invention includes a method of creating a mattress insert, including filling a first compartment with gel beads and filling at least one additional compartment with gel beads, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, connecting a tubing system to the first compartment via a tubing port, wherein the tubing port is configured to receive a first end of the tubing system, feeding the tubing system through a foam support structure and coupling the tubing system to a valve port, the valve port comprises a valve protruding from an external surface of the foam support structure, coupling a water delivery system to the valve, the valve delivering water to the tubing system via the valve port and the tube system delivering the water to the first compartment, the gel beads of the first compartment absorbing the water and expanding.

In yet another embodiment, the present invention includes a bedding system, including an insert comprising a plurality of compartments, a tubing system coupled to a water delivery system via a valve, and a foam support structure, wherein the insert is configured to be placed within the foam support structure, wherein each of the plurality of compartments of the insert contains a plurality of gel beads, wherein the plurality of compartments are coupled via dividers, wherein the dividers are semipermeable, and the plurality of gel beads do not traverse the dividers, wherein at least one compartment of the plurality of compartments is coupled to the tubing system, wherein the tubing system is contained within the foam support structure, wherein the tubing system comprises a first end coupled to the valve, at least one end coupled to the at least one compartment, and at least one additional end coupled to at least one additional compartment of the plurality of compartments, wherein the valve is configured to be coupled to a water delivery system, wherein the tubing system is configured to deliver water from the valve to the at least one compartment, wherein, upon delivery of the water to the at least one compartment, the water traverses the dividers and is dispersed through the plurality of compartments, and wherein the plurality of gel beads are configured to absorb the water and expand.

In one embodiment, the present invention includes a system for simultaneously cooling and supporting the head and neck, including a topper comprising a plurality of compartments, a valve coupled to at least one of the plurality of compartments, and a support structure, wherein the topper is secured to the support structure, wherein each of the plurality of compartments of the topper contains a plurality of gel beads, wherein the plurality of compartments are coupled via dividers, wherein the plurality of gel beads do not traverse dividers, wherein the valve is configured to be coupled to a water delivery system, wherein the valve is configured to deliver water from the water delivery system to the at least one compartment, and wherein the plurality of gel beads are configured to absorb the water and expand.

In another embodiment, the present invention includes a method of creating and implementing a pillow topper to support and cool the head and neck, including preparing the pillow topper, the steps comprising, filling a first compartment with gel beads and filling at least one additional compartment with gel beads, wherein the first compartment is coupled to a valve, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, coupling a water delivery system to the valve, the valve delivering water to the first compartment, and the gel beads of the first compartment absorbing the water and expanding, and securing the pillow to a support structure, wherein the first compartment and/or the at least one additional compartment comprises an elastic fastener which is secured around the support structure.

In yet another embodiment, the present invention includes a system for simultaneously cooling and supporting the head and neck, including a topper comprising a plurality of compartments, a first valve coupled to a water delivery system, a second valve coupled to the water delivery system, and a support structure, wherein the plurality of compartments are subdivided into at least two subunits, wherein a first subunit of the at least two subunits comprises at least two compartments and the at least two compartments are coupled via semi-permeable dividers, wherein the first subunit is coupled to a second subunit of the at least two subunits via an impermeable divider, wherein each of the plurality of compartments of the topper contains a plurality of gel beads, wherein the semi-permeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semi-permeable dividers and is dispersed through the at least two compartments, wherein the plurality of gel beads are configured to absorb the water and expand, and wherein the topper further comprises a first elastic fastener and a second elastic fastener, wherein the first elastic fastener is configured to be secured around a first end of the support structure and the second elastic fastener is configured to be secured around a second end of the support structure.

In one embodiment, the present invention includes a system for providing a therapeutic weight and simultaneously regulating body temperature, including a gel layer including a plurality of compartments, a valve coupled to at least one of the plurality of compartments, and a cloth covering, wherein the gel layer is enclosed within the cloth covering, wherein each of the plurality of compartments of the gel layer contains a plurality of gel beads, wherein the plurality of compartments are coupled via dividers, wherein the plurality of gel beads does not traverse the dividers, wherein at least one compartment of the plurality of compartments is connected to the valve, wherein the valve is configured to be coupled to a water delivery system, wherein the valve is configured to deliver water from the water delivery system to the at least one compartment, and wherein the plurality of gel beads are configured to absorb the water and expand.

In another embodiment, the present invention includes a method of creating a weighted blanket for providing a therapeutic weight and simultaneously regulating body temperature, including preparing a gel layer, the steps including, filling a first compartment with gel beads and filling at least one additional compartment with gel beads, wherein the first compartment is coupled to a valve, coupling a first compartment to the at least one additional compartment, wherein the first compartment and the at least one additional compartment contain a plurality of gel beads, dividers dividing the first compartment and the at least one additional compartment, wherein the dividers prevent the intercompartmental movement of gel beads, coupling a water delivery system to the valve, the valve delivering water to the first compartment, and the gel beads of the first compartment absorbing the water and expanding, and enclosing the gel layer in a cloth covering.

In yet another embodiment, the present invention includes a system for providing a therapeutic weight and simultaneously regulating body temperature, including a gel layer including a plurality of compartments, a weighted layer, a first valve coupled to a water delivery system, a second valve coupled to the water delivery system, and a cloth covering, wherein the plurality of compartments are subdivided into at least two subunits, wherein a first subunit of the at least two subunits includes at least two compartments and the at least two compartments are coupled via semi-permeable dividers, wherein the first subunit is coupled to a second subunit of the at least two subunits via an impermeable divider, wherein each of the plurality of compartments of the gel layer contains a plurality of gel beads, wherein the semi-permeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semi-permeable dividers and is dispersed through the at least two compartments, wherein the plurality of gel beads are configured to absorb the water and expand, and wherein the weighted layer is coupled to the gel layer, wherein the first valve and/or the second valve traverses the weighted layer.

In one embodiment, the present invention includes a mattress topper for providing full-body temperature and support during rest, including an insert comprising a plurality of compartments, a valve coupled to at least one of the plurality of compartments, and an elastic cloth comprising an elasticized hem, wherein each of the plurality of compartments of the insert contains a plurality of gel beads, wherein the plurality of compartments are coupled via dividers configured to prevent the plurality of gel beads from traversing the dividers, wherein the valve is configured to be coupled to a water delivery system, wherein the valve, in an open position, is able to configured to allow water from the water delivery system to enter the at least one compartment, wherein the plurality of gel beads are configured to absorb the water and expand, and wherein the insert is coupled to the elastic cloth, wherein the elasticized hem is configured to stretch around a mattress and secure the elastic cloth and the insert to the mattress.

In another embodiment, the present invention includes a method of creating and implementing a mattress topper to support and cool the body, including preparing the mattress topper, the steps comprising, filling a first compartment with gel beads and filling at least one additional compartment with gel beads, wherein the first compartment is coupled to a valve, coupling the first compartment to the at least one additional compartment, via one or more dividers, the one or more dividers preventing the movement of the gel beads from the first compartment to the at least one additional compartment, coupling a water delivery system to the valve, the valve delivering water to the first compartment, and the water diffusing through the first compartment and the at least one additional compartment, the gel beads of the first compartment and the at least one additional compartment absorbing the water and expanding, and securing the mattress topper to a mattress.

In yet another embodiment, the present invention includes a mattress topper for providing full-body temperature and support during rest, including an insert comprising a plurality of compartments, a first valve coupled to a water delivery system, a second valve coupled to the water delivery system, and a cloth covering coupled to at least one elastic fastener, wherein the plurality of compartments are subdivided into at least two subunits, wherein a first subunit of the at least two subunits comprises at least two compartments and the at least two compartments are coupled via semipermeable dividers, wherein the first subunit is coupled to a second subunit of the at least two subunits via an impermeable divider, wherein each of the plurality of compartments of the insert contains a plurality of gel beads, wherein the semipermeable dividers and the impermeable divider are configured to prevent the intercompartmental movement of the plurality of gel beads, wherein the first subunit is coupled to the first valve and the second subunit of the at least two subunits is coupled to the second valve, wherein the first valve is coupled to the water delivery system and is configured to deliver water to the first subunit, wherein the second valve is coupled to the water delivery system and is configured to deliver water to the second subunit, wherein, upon delivery of the water to the first subunit, the water traverses the semipermeable dividers and is dispersed through the at least two compartments, wherein the plurality of gel beads are configured to absorb the water and expand, wherein the cloth covering comprises a pocket configured to receive the insert, wherein the at least one elastic fastener of the cloth covering is configured to be secured around at least a portion of a mattress.

Waterbeds, or floatation mattresses, achieved great popularity in the 1980s. Waterbeds have certain advantages relative to traditional mattresses. First, many users cite waterbeds being more comfortable, largely due to the form-matching nature of the mattress. Additionally, the distribution of pressure in a waterbed is both advantageous in shifting pressure away from the spine, for back pain relief, and in preventing bed sores. Furthermore, due to the high specific heat of water, waterbeds tend to remain colder than traditional mattresses in the absence of application of heat, and even with the application of a relatively small amount of heat.

However, waterbeds have fallen greatly in popularity for multiple reasons, one of which being that maintenance of waterbeds is often challenging, especially relative to traditional mattresses, as the water needs to be recycled and the interior treated to prevent algae growth regularly. The large volume of water in the beds also produces a significant risk of water damage should the bed become damaged, and many apartments have banned them on higher floors to prevent risk to lower residents. Some hardside waterbeds are also challenging for some users to get on and off of, as the variable distribution of weight causes the water within the water bed to be displaced and thereby limits the support available to assist a use in rising from the bed.

What is needed are bedding components which provide for the low-maintenance, no leak characteristics of a traditional mattress with the feeling, pressure relief, and temperature regulation capabilities of a waterbed. Further, the mattress insert should not significantly hinder a user from rising from the bed and should thus have a supportive property that prevents the complete redistribution of fluid-like contents when pressure is applied to the mattress insert.

The present invention is directed to a mattress insert, configured to be placed inside a foam mattress structure (e.g., a traditional mattress, a memory foam mattress, a waterbed, etc.). The mattress insert includes a plurality of compartments, each filled with gel and water in order to simulate the feeling, pressure relief, and passive temperature regulation of a waterbed. Tubing running through the mattress and connecting to one or more compartments of the insert allows for the application of fluid to the compartment or compartments. A valve on the outside of the mattress connects to the internal tubing and includes a hose attachment port for coupling to a water application system (e.g., a hose). Alternatively, the teachings of the present invention are also able to be applied to pillows, pillowcases, weighted blankets, mattress toppers, animal beds, and/or other articles as described further below.

The gel beads in each compartment of the mattress insert help to absorb and distribute weight evenly across the mattress and provide contouring effects for a user similar to that of a waterbed. The inclusion of multiple compartments prevent the water-gel mixture from excessive movement during use, or from accumulation toward the edges of the insert when a user lies on the mattress. Furthermore, compartmentalization of the gel beads helps to maintain relatively uniform distribution of the gel beads and water even when the mattress is tilted or inclined. This is especially useful if the bed itself is bent or inclined. Furthermore, for adjustable beds, using multiple partitions is useful both for ensuring that the gel beads and water are still appropriately distributed upon adjustment and for ensuring that the mattress insert still easily conforms to the shape of the adjusted beds, as the individual compartments are flexible. This technology is applicable to beds, including medical beds and dog beds, recliners, chairs, and sofas.

Referring now to the drawings in general, the illustrations are for the purpose of describing one or more preferred embodiments of the invention and are not intended to limit the invention thereto.

FIG. 1 illustrates a mattress with the mattress insert according to one embodiment of the present invention. The compartments 101, 102, 103 of the mattress insert are connected via dividers 104, 105 (e.g., semi-permeable dividers or water permeable dividers). The mattress insert comprising the compartments 101, 102, 103 is placed within or on top of the foam structure 112 of the mattress. The tubing system including filler tube 120 is connected to the insert, and valve 125 located at a valve port 130 serves as a connection point for the water delivery system disclosed herein.

Figure 2:
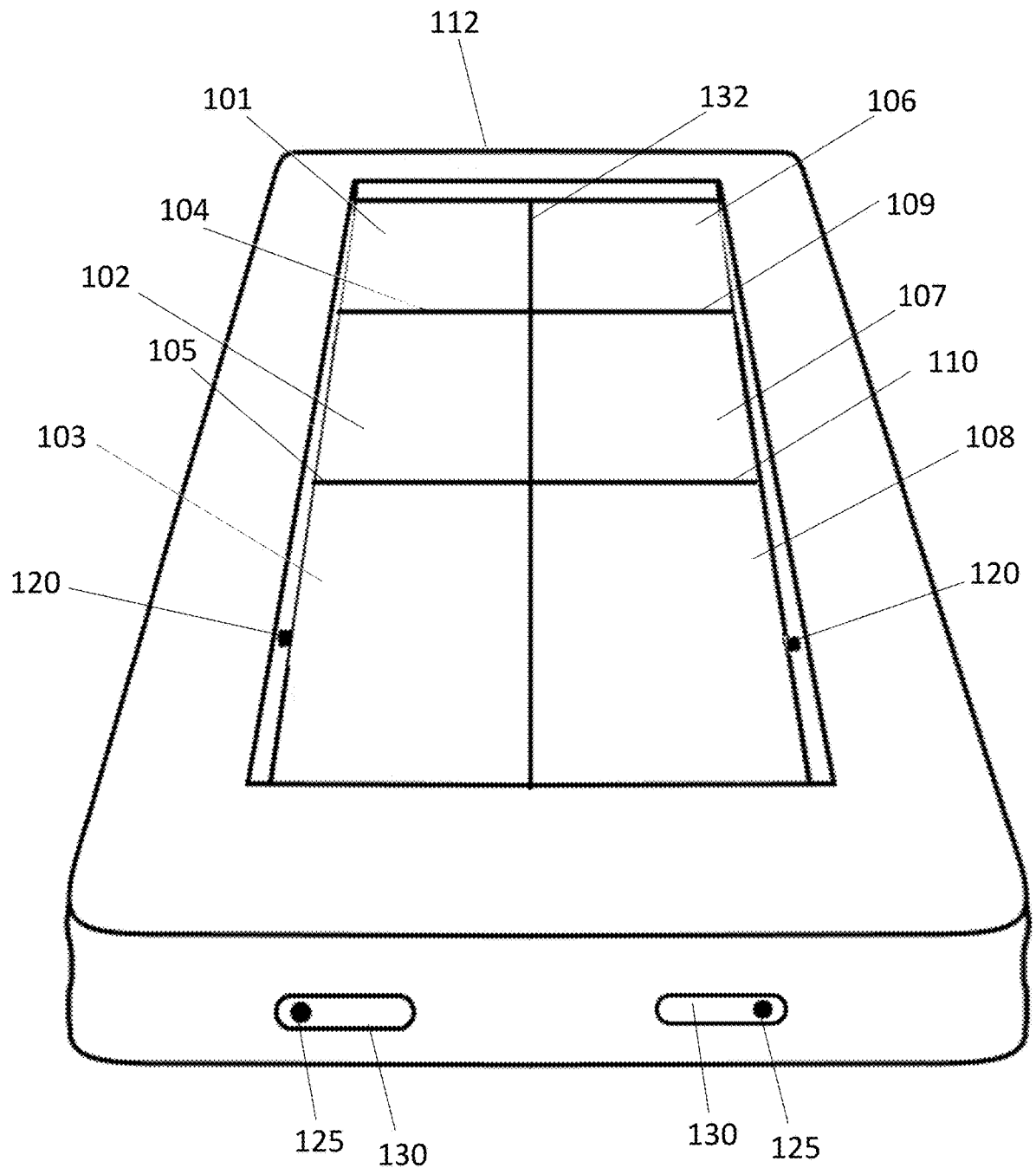
FIG. 2 illustrates a mattress with the mattress insert including six compartments according to one embodiment of the present invention.

FIG. 2 illustrates a mattress with the mattress insert including six compartments according to one embodiment of the present invention. The compartments 101, 102, 103 of the mattress insert are connected via dividers 104, 105 (e.g., semi-permeable dividers or water permeable dividers), and compartments 106, 107, 108 are connected via dividers 109, 110. The mattress insert comprising the compartments 101, 102, 103, 106, 107, 108 is placed within or on top of the foam structure 112 of the mattress. The tops of the compartments 101, 102, 103, 106, 107, 108 are covered by a waterproof barrier or layer, and a ticking fabric of a mattress is positioned on top of the waterproof barrier or layer. The ticking fabric is preferably fire retardant or fire resistant. A water impermeable divider 132 separates the first group of compartments 101, 102, 103 and the second group of compartments 106, 107, 108. This configuration provides for a mattress with sides separately fillable based on preferences of users for the mattress. For instance, if a mattress is used by two users, a preference of one user may be to not have a mattress which simulates a waterbed. A user may have a health condition such as arthritis, which would render the mattress with the beads and water too cold and painful for regular use. The tubing systems in FIG. 2 include one system for each side of the mattress, with each tubing system including a filler tube 120 connected to the insert, and a valve 125 located at a valve port 130 serving as a connection point for the water delivery system for each side. Water is delivered through attachment of the valve to a hose or by pouring water into the valve. In one embodiment, the mattress is turned such that the valve and valve port are on the top side of the mattress, and water is delivered through the valve port. Once water enters the valve, the water passes from the valve 125 to the filler tube 120 and into the compartments. In one embodiment, the water passes through the compartment attached to the filler tube 120 and then through the other compartments to cause the gel beads to become swollen within the compartments, filling the compartments and causing the gel beads to swell within the compartments sequentially or relatively sequentially, i.e., mostly filling one compartment or causing the gel beads to be mostly swollen in one compartment before moving to the next compartment. Alternatively, a filler tube is attached to each compartment and is in fluid communication with tubing running from the valve port such that the compartments are operable to be filled simultaneously. Although FIGS. 1 and 2 illustrate the mattress as having a valve and valve port, the present invention is also operable to not include a valve or valve port and for water or another fluid to be added to the compartments of the mattress insert during production of the mattress, such that water is not able to be added or removed from the mattress insert or mattress after the product is finished.

In one embodiment, the compartments of the insert, excluding the dividers, are comprised of a waterproof material. Each of the compartments preferably includes one or more sides, a bottom, and a top, with each of these components of the compartment being waterproof except for dividers between compartments, if desired. Examples of waterproof materials include but are not limited to polyvinyl chloride (PVC), silicone, polyurethane, latex, rubber, and polyethylene (e.g., high density polyethylene [HDPE]), and/or any combination thereof. In one embodiment, the compartments of the insert and/or the edges of each compartment are reinforced with drop stitch material and/or urethane foam to provide a firm and stable boundary and to prevent leaks. Reinforcement helps to maintain a consistent shape and structure for the insert if a bed is adjusted.

In one embodiment, the mattress insert includes a plurality of compartments. Each compartment contains an amount of gel beads described herein. Upon contacting a fluid (e.g., water), the gel beads are configured to absorb the fluid and expand. The gel beads provide a mattress insert that mimics the feeling of a waterbed due to the fluid absorbed by the beads, while eliminating the risk of fluid leakage and damage caused by such leakage. In one embodiment, 1 oz of unexpanded gel beads, when fully expanded, has a weight of about 110 oz. In one embodiment, 1 oz of unexpanded gel beads, when fully expanded, has a weight of between about 90 oz to 140 oz. Table 1 describes exemplary, approximate sizes for the gel beads according to one embodiment of the present invention.

TABLE 1

| Unexpanded Bead Size | 1 mm | 2.5 mm | 4 mm |
| --- | --- | --- | --- |
| Expanded Bead Size | 0.3 cm-0.5 cm | 0.9-1.3 cm | 1.5-2.0 cm |

In one embodiment, the gel beads are comprised of one or more super-absorbent polymers (SAP), including but not limited to cross-linked polyacrylates (including sodium polyacrylate), cross-linked polyacrylamides, cellulose-acrylonitrile graft copolymers, starch-acrylonitrile graft copolymers, starch-based polymers synthesized using corn starch, potato starch, pea starch, and/or tapioca starch, and cross-linked maleic anhydride copolymers. Biodegradable and/or biocompostable superabsorbent polymers or biopolymers are operable to be utilized in the present invention, with biopolymers including amylose and/or amylopectin, chitosans, hemicelluloses, lignins, celluloses, chitins, alginates, dextrans, pullanes, polyhydroxyalkanoates, fibrins, cyclodextrins, proteins (e.g., soy protein), other polysaccharides (e.g., pectin), polylactic acids, and/or combinations thereof.

In one embodiment, the super absorbent polymer is cross-linked using a crosslinking agent. A crosslinking agent is a small molecule or monomer that has dual binding functionality on at least two binding sites. Examples of crosslinking agents include but are not limited to trimethylolpropane triacrylate (TMPTA), ethylene glycol dimethylacrylate (EGDMA), methylene bis-acrylamide, allyl methacrylate, tetraallyl ethoxy ethane. One of ordinary skill in the art will appreciate that the combination of the superabsorbent polymer and the crosslinking agent is operable to result in varying properties for the gel beads of the present invention. For example, a gel bead of sodium polyacrylate crosslinked with a first crosslinking agent expands at a first rate, while a gel bead of sodium polyacrylate crosslinked with a second crosslinking agent expands at a second rate. In one embodiment, the gel bead of the present invention absorbs water at a rate between about 2 mL/sec-3.5 mL/sec. In one embodiment, the gel bead of the present invention absorbs water at a rate of about 10 mL/sec. In one embodiment, the gel bead of the present invention absorbs water at a rate of about 1 mL/sec, 2 mL/sec, 3 mL/sec, 4 mL/sec, 5 mL/sec, 6 mL/sec, 7 mL/sec, 8 mL/sec, 9 mL/sec, or 10 mL/sec. In one embodiment, about 10 mg of gel beads are configured to absorb about 10 L of water.

In one embodiment, the gel beads of the present invention are all comprised of the same superabsorbent polymer composition. In one embodiment, the gel beads of the present invention are comprised of at least two different superabsorbent polymer compositions. In one embodiment, the gel beads of the present invention are all an identical size (i.e., equivalent diameters) in an unexpanded state. In one embodiment, the gel beads of the present invention are all an identical size in an expanded state. In one embodiment, the gel beads of the present invention are not uniform in size in an unexpanded state, but when exposed to water or other absorbed fluid and expanded into an expanded state, the gel beads are identical in size.

In one embodiment, one or more compartments of the present invention are connected via a semi permeable divider. In one embodiment, the divider is a size selective mesh divider, wherein the plurality of openings in the mesh have a diameter that is smaller than the gel beads in the unexpanded state. In one embodiment, the divider is a size selective mesh divider, wherein the plurality of openings in the mesh have a diameter that is smaller than the gel beads in the expanded state. In one embodiment, the gel beads of the present invention have varying diameters when in the same state (e.g., an expanded first bead has a greater diameter than an expanded second bead). In one embodiment, the divider is a size selective mesh divider, wherein the plurality of openings in the mesh have a diameter that is larger than a portion of the gel beads in the expanded state, but smaller than a remaining portion of the beads.

In one embodiment, the divider is a plastic seam created using a through-transmission welding process. A focused laser beam is passed through an upper, laser transmissive layer of the compartment to the interface of the top layer and the bottom layer. The laser light is turned into heat energy as it is absorbed by the bottom layer, and the heat created at the interface creates a molten weld seam fusing the top layer of the compartment with the bottom layer of the compartment. In one embodiment, this welded seam is semi permeable or water permeable in that the seam comprises a plurality of openings such that fluid is operable to pass between compartments of the insert, while the gel beads are not operable to pass through, either in a swollen or non-swollen state. In one embodiment, the plurality of openings have a diameter that is smaller than the gel beads in the unexpanded or non-swollen state. In one embodiment, the plurality of openings have a diameter that is smaller than the gel beads in the swollen or expanded state. In one embodiment, the gel beads of the present invention have varying diameters when in the same state (e.g., an expanded first bead has a greater diameter than an expanded second bead). In one embodiment, the plurality of openings have a diameter that is larger than a portion of the gel beads in the expanded state, but smaller than a remaining portion of the beads.

In one embodiment, one or more compartments of the present invention are connected via a non-permeable divider. In one embodiment, the divider is a continuous plastic seam created using a through-transmission welding process, with no openings in the seam, preventing the movement of materials, including fluid, from one compartment to an adjacent compartment. In one embodiment, the mattress insert of the present invention comprises both semi-permeable and nonpermeable dividers. In one embodiment, a subset of the compartments of the present invention are connected using semi-permeable dividers, and the subset of the compartments are coupled to one or more adjacent compartments using non-permeable dividers.

In one embodiment, the compartments of the present invention have different densities of super absorbent polymer to provide for different rates of cooling or heating for different parts of the human body. Temperature is one of the largest factors for sleep, with lower temperatures during a night's sleep generally correlating to more deep sleep or slow wave sleep (SWS). The temperature of certain portions of the human body affects a person's sleep cycle, including how quickly deep sleep is entered and the length of deep sleep, as well as other periods of a person's sleep cycle. The compartments of the present invention preferably include densities of gel beads or super absorbent polymer which provide for quicker or a higher rate of passive cooling of certain portions of the human body to maximize deep sleep. In one example of the present invention, three compartments in the mattress insert correspond to a head and neck portion of a user, a torso portion of a user, and a legs and feet portion of a user. As used in the present application, the torso portion refers to a part of the body containing the chest, abdomen, pelvis, and back, or the human body apart from the head, neck, arms, and legs. In one embodiment, the compartment corresponding to a torso portion includes the highest density of gel beads or superabsorbent polymer compared to the compartment corresponding to the head and neck and the compartment corresponding to the legs and feet. In one embodiment, the present invention includes two compartments or two compartments for each user, with the two compartments corresponding to a torso portion of a user and a legs and feet portion of a user. In this embodiment, there is no compartment in the mattress insert corresponding to the legs and feet of a user, and the material that is used for the remainder of the top of the mattress is used for the portion of the mattress corresponding to the typical location of a neck and a head of a user.

The higher the density of superabsorbent polymers in a compartment, the quicker or higher the passive cooling rate provided by that compartment. For example, a middle compartment corresponding to a torso of a user has the highest density of superabsorbent polymer compared to the compartment corresponding to the leg and feet region and the compartment corresponding to the head region. By having a higher concentration of superabsorbent polymer in the torso region, the present invention provides for greater passive cooling of the torso region compared to the other regions of the body, which aids in facilitating deep sleep and a more beneficial sleep cycle of a user.

In one embodiment, the compartments of the present invention are even and identical in shape. In one embodiment, the compartments are geometric subsections of the mattress insert of the present invention (e.g., a grid system which divides the insert into squares). In one embodiment, the compartments are organic subsections corresponding to an anatomical shape of a human user. For example, in one embodiment, the head region of the mattress insert corresponding to the head of a user comprises a compartment with an ovoid shape.

The compartments of the present invention are operable to be different lengths and sizes. In one embodiment, the compartment corresponding to the torso portion is approximately two to four times the length of the compartment corresponding to the head and neck portion, and more preferably approximately three times the length of the compartment corresponding to the head and neck portion. In one embodiment, the compartment corresponding to the legs and feet is approximately four times the length of the compartment corresponding to the head and neck portion. In one embodiment, the head and neck compartment of the mattress insert is narrower than the torso portion of the mattress insert.

Figure 3:
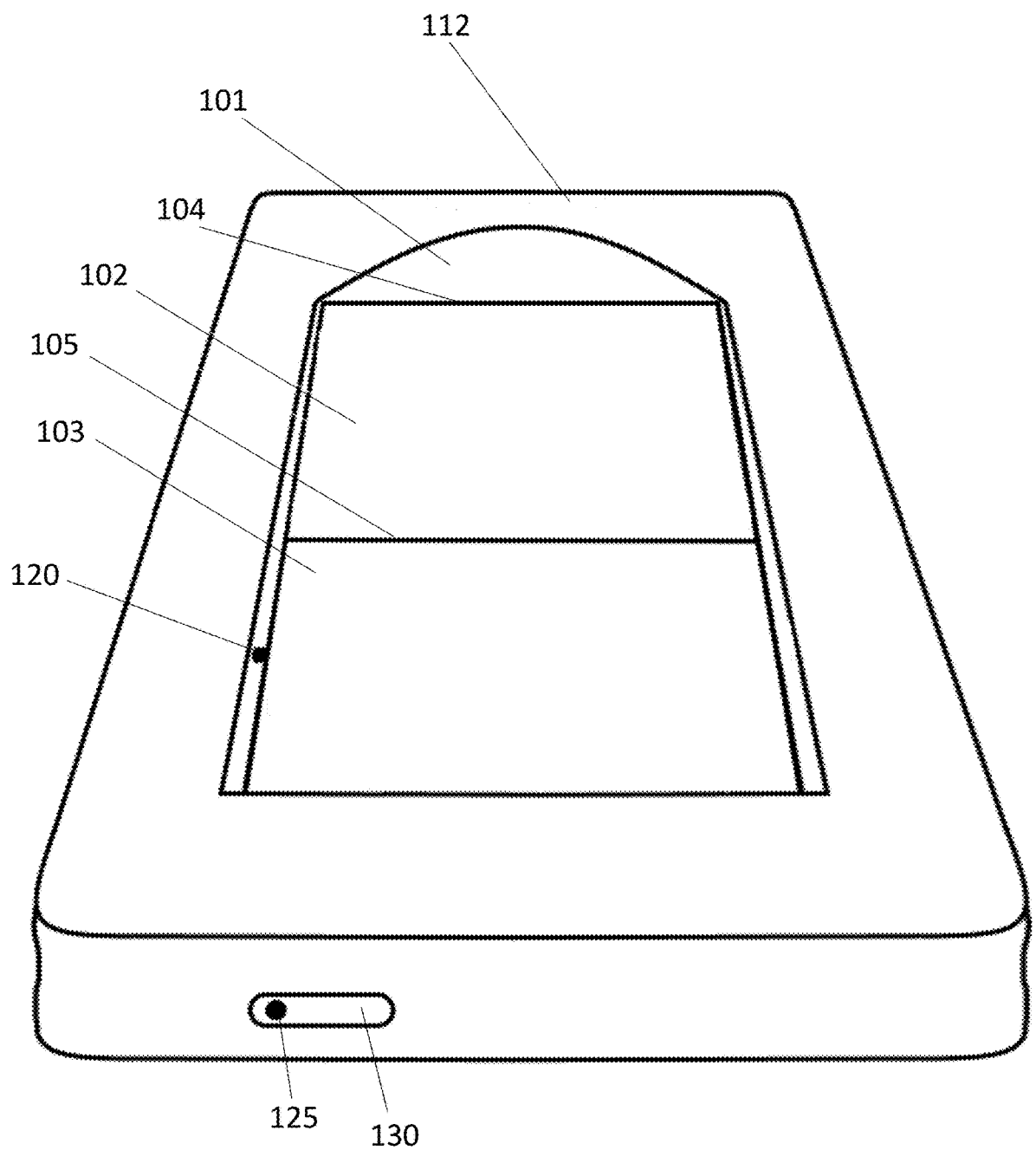
FIG. 3 illustrates a mattress with the mattress insert including two differently sized rectangular compartments and a semi oval compartment according to one embodiment of the present invention.

FIG. 3 illustrates a mattress with the mattress insert including two differently sized rectangular compartments and a semi oval compartment according to one embodiment of the present invention.

The present is operable to include a phase change material (PCM) layer on top of the mattress insert including compartments with the gel beads or super absorbent polymer.

The density of PCM in the layer on top of the mattress insert is operable to include different densities corresponding to different compartments in the mattress insert. For example, the torso region of the layer including the PCM has a higher density of PCM compared to the head and neck and legs and feet regions. The PCM facilitates passive heat transfer from a body of a person on the mattress to the mattress insert including the gel beads. In one embodiment, the PCM is dispersed within a foam layer on top of the mattress insert or applied to a top of a foam layer on top of the mattress.

In one embodiment, the valve of the present invention is a one-way valve. The use of a one-way valve allows for the application of water to the insert using the tubing system coupled to the water delivery system via the valve. In one embodiment, the valve of the present invention is a two-way valve, enabling the connection of a water delivery system with vacuum functionality such that water is operable to be both applied to the compartments of the insert and removed from the compartments of the insert via the valve. In one embodiment, the system of the present invention is operable to include multiple valves (e.g., multiple one-valves). A water delivery system is operable to be coupled to the mattress insert via a first valve, and a vacuum system is operable to be coupled to the mattress via a second valve. In one embodiment, each valve of the present invention enables the coupling of a water delivery system and/or a vacuum system to a single compartment of the insert. In one embodiment, each individual compartment is connected to at least one valve via an internal tubing system. In one embodiment, a port connecting an end of the tubing system to the compartment is covered with a semipermeable material (e.g., a mesh as disclosed herein) to prevent the ingress of the beads into the tubing system.

In one embodiment, an inner layer of the mattress insert which is exposed to the water and/or the gel beads (i.e., an interior layer of the one or more compartments) is infused and/or coated with at least one anti-microbial, anti-bacterial, or anti-fungal substance. In one embodiment, the at least one anti-microbial substance includes zinc pyrithione, silver, silane quaternary ammonia compounds, isothiazolinone, thiabendazole, curcumin, cyclodextrin, 3-Allyl-5,5-dimethyl-hydantoin (ADMH), graphene, and polyhexamethylene biguanide (PHMB). In one embodiment, the at least one anti-bacterial substance includes hypochlorites, chloramines, dichloroisocyanurate and trichloroisocyanurate, peracetic acid, potassium persulfate, sodium perborate, sodium percarbonate, urea perhydrate, povidone-iodine, Lugol's solution, iodine tincture, iodinated nonionic surfactants, ethanol, 1-propanol and mixtures thereof, 2-propanol and mixtures thereof, 2-phenoxyethanol, 1- and 2-phenoxypropanols, phenolic substances (e.g., thymol, halogenated [chlorinated, brominated]phenols), quaternary ammonia cationic compounds, and non-quaternary cationic compounds (e.g., chlorhexidine, glucoprotamine, octenidine dihydrochloride), or any combination thereof.

In one embodiment, the mattress insert includes a foam support structure underneath the insert. In one embodiment, the foam support structure has a significantly flat surface. In one embodiment, the foam support structure is a ridged surface, comprising a series of ridges. In one embodiment, the foam support structure comprises polyurethane foam, including convoluted foam designs, low-resilience polyurethane (LRPu) foam, and/or latex foam, including natural rubber latex, styrene-butadiene rubber latex, polychloroporene, and/or acrylonitrile-butadienelatex.

Figure 4:
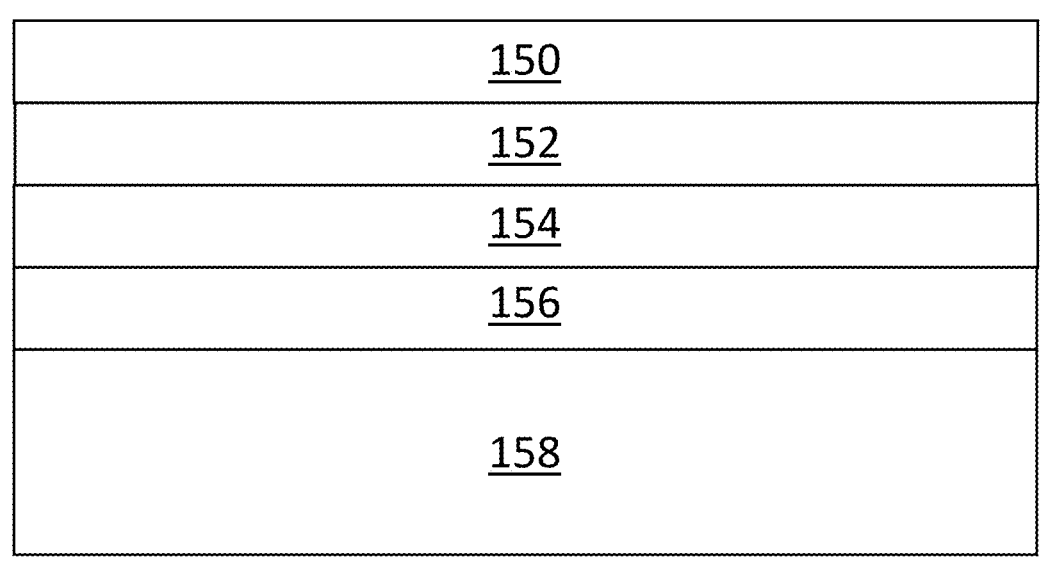

FIG. 4 illustrates a side orthogonal view of a mattress including the mattress insert of the present invention. In one embodiment, the mattress includes a top ticking layer 150 and a fire-retardant layer 152 positioned beneath the top ticking layer 150. One of ordinary skill in the art will understand that the top ticking layer 150 is able to include one or more distinct sublayers. In one embodiment, mattress insert 154 of the present invention is inserted directly below the fire-retardant layer 152, however one of ordinary skill in the art will understand that the insert 154 is able to be placed above the fire-retardant layer 152 but below the ticking layer 150 or beneath further layers of the mattress. In one embodiment, the mattress does not include a distinct fire-retardant layer, and the insert 154 is able to act as a fire-retardant layer instead. Furthermore, one of ordinary skill in the art will understand that the mattress is able to include a plurality of mattress inserts 154 according to the present invention which are the same or different. In one embodiment, a comfort layer 156 is positioned beneath the insert 154. In one embodiment, the comfort layer 156 includes a supportive foam layer, a memory foam layer, a liquid gel layer, and/or other types of layers. One of ordinary skill in the art will understand that the comfort layer 156 is able to include one or more sublayers of the same or different types. In one embodiment, beneath the comfort layer 156 is a structure support layer 158. In one embodiment, the structure support layer 158 includes at least one denser foam layer, at least one spring layer, a memory foam layer, a latex layer, and/or any other type of support layer known in the art. One of ordinary skill in the art will understand that the structure support layer 158 is able to include one or more sublayers of the same or different type.

One of ordinary skill in the art will understand the sizes of mattress according to the present invention are not intended to be limiting and include, at least, small single, twin, twin XL, super single, double, full, queen, RV Queen, Olympic queen, king, California king, Texas King, RV King, Wyoming King, Alaska king, Emperor, and/or other sizes.

Figure 5A:
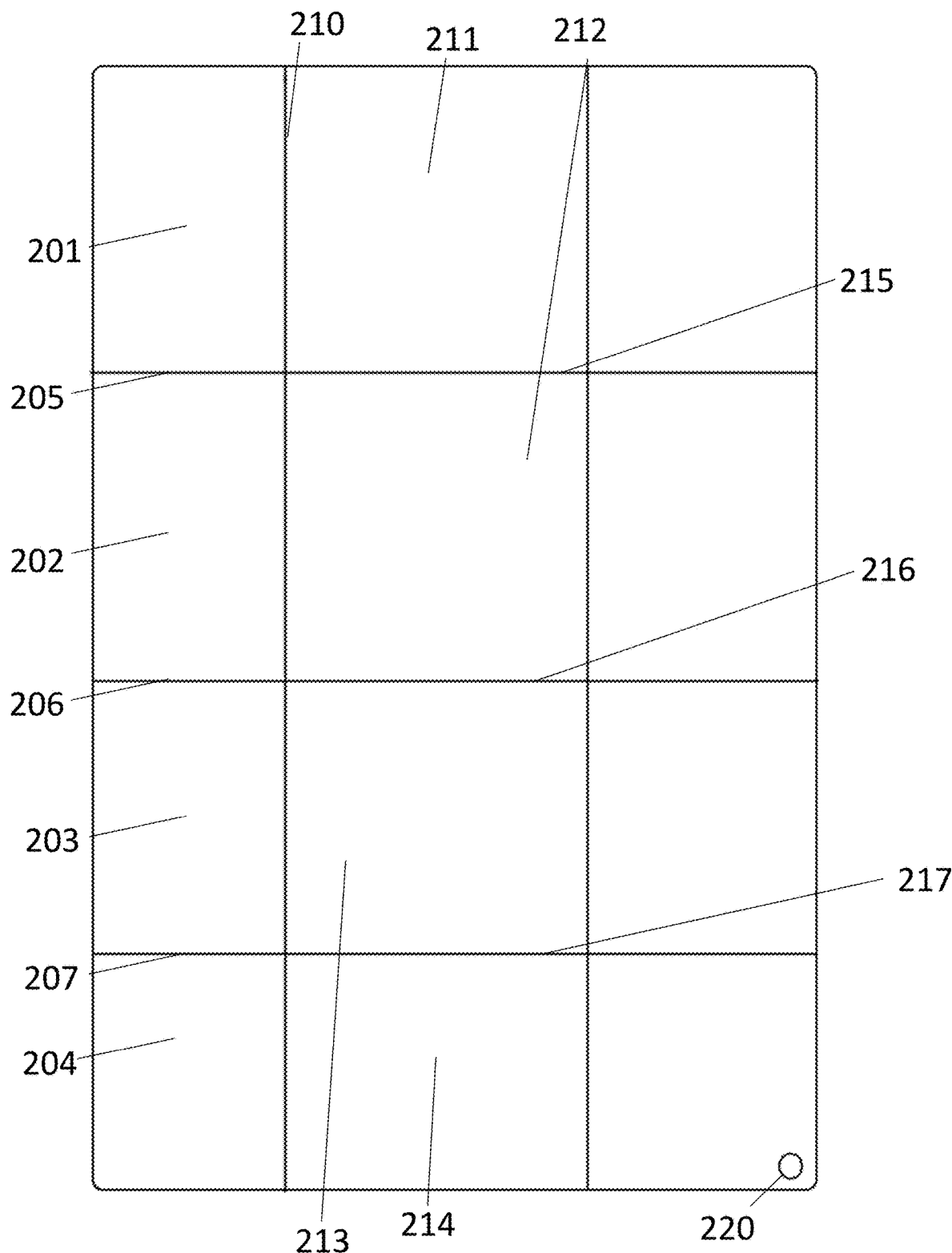
FIG. 5A illustrates a top view of a mattress topper with twelve compartments according to one embodiment of the present invention.

FIG. 5A illustrates the mattress topper according to one embodiment of the present invention. The compartments 201, 202, 203, 204 of the mattress topper are connected via dividers 205, 206, 207 (e.g., semipermeable dividers). A divider 210 also connects another column of compartments 211, 212, 213, 214 to the first column of compartments. The compartments of the additional column are connected via dividers 215, 216, 217. A valve 220 is connected to a compartment 204 of the mattress topper and serves as a connection point for the water delivery system disclosed herein.

In one embodiment, adjacent compartments are connected using a combination of semipermeable dividers and impermeable dividers. For example, the mattress topper of FIG. 5A is depicted with a single valve 220. However, in one embodiment, the mattress topper has multiple vales, each of which connect to a single subunit of compartments that are connected using semipermeable dividers, and which are connected to another subunit of compartments via impermeable dividers. For example, one subunit of compartments (e.g., compartments 201, 202, 203, 204) is connected via semipermeable dividers (e.g., dividers 204, 205, 207), and an adjacent column or subunit of compartments (e.g., compartments 211, 212, 213, 214) are also connected via semipermeable dividers (e.g., dividers 214, 215, 217). However, the two subunits (i.e., the first subunit of compartments 201, 202, 203, 204 and the second subunit of compartments 211, 212, 213, 214) are connected via an impermeable divider (e.g., the divider 210). In this embodiment, each subunit would be connected to a valve (i.e., each compartment would be connected to a valve either directly or indirectly via one or more compartments with semipermeable dividers). In one embodiment, the compartments are coupled together using semipermeable dividers that are permeable to water, while the compartments are coupled to a cloth covering using an impermeable divider.

In one embodiment, the compartments of the mattress topper of the mattress topper are comprised of a waterproof material. Examples of operable materials include but are not limited to polyvinyl chloride (PVC), silicone, polyurethane, latex, rubber, and polyethylene (e.g., high density polyethylene [HDPE]), and any combination thereof. In one embodiment, the compartments of the gel and/or the edges of each compartment are reinforced with drop stitch material and/or urethane foam to provide a firm and stable boundary and to prevent leaks. Furthermore, reinforcement helps to maintain a consistent shape and structure for the mattress topper if the mattress is adjusted.

In one embodiment, the mattress topper includes a plurality of compartments. Each compartment contains an amount of gel beads described herein. Upon contacting a fluid (e.g., water), the gel beads are configured to absorb the fluid and expand. The gel beads provide a mattress topper that cools the body due to the fluid absorbed by the beads. In one embodiment, 1 oz of unexpanded gel beads, when fully expanded, has a weight of about 110 oz. In one embodiment, 1 oz of unexpanded gel beads, when fully expanded, has a weight of between about 90 oz to 140 oz.

Figure 5B:
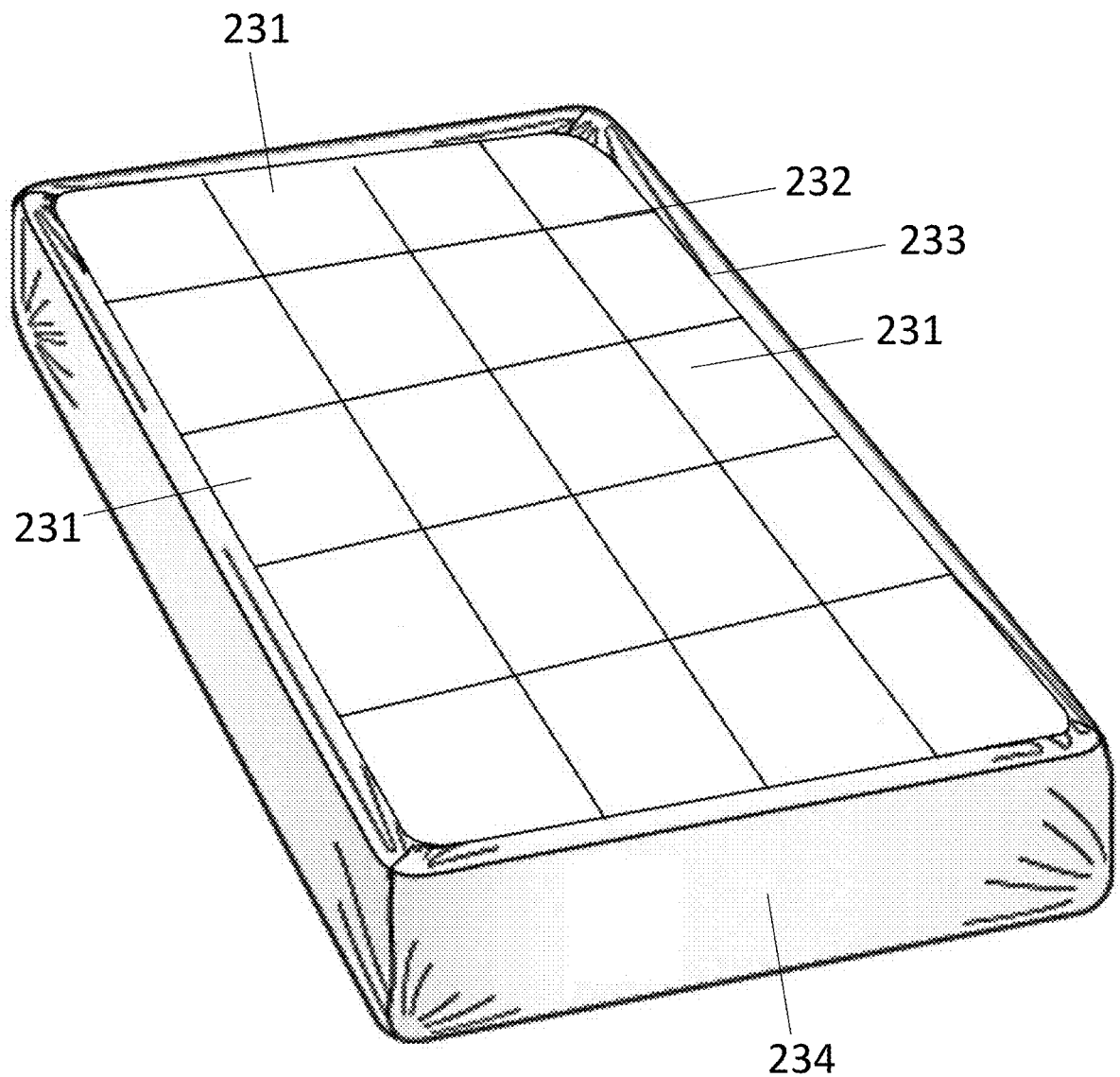
FIG. 5B illustrates a perspective view of a mattress topper on top of a mattress according to one embodiment of the present invention.
Figure 5C:
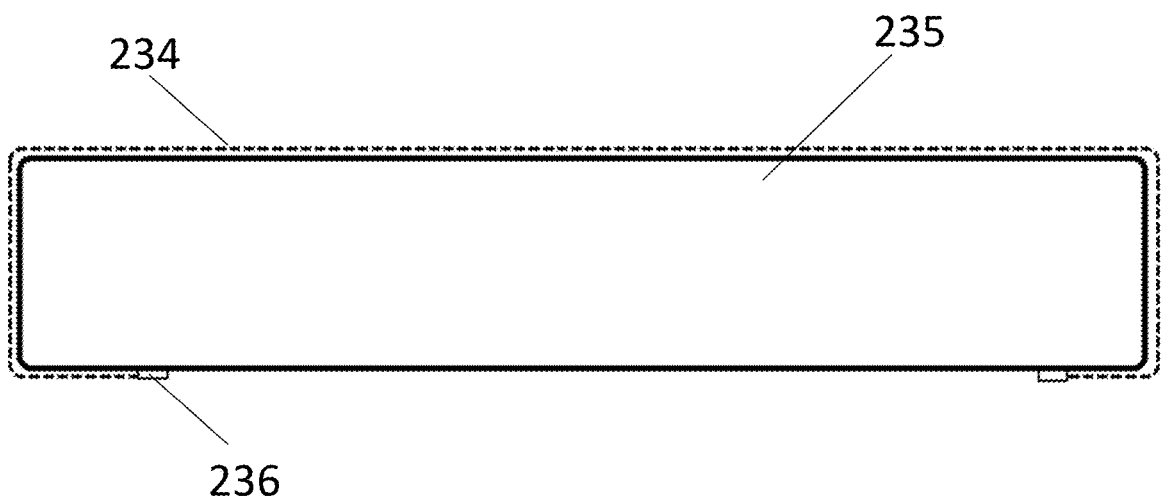
FIG. 5C illustrates a side view of a mattress topper on top of mattress according to one embodiment of the present invention.
Figure 5D:
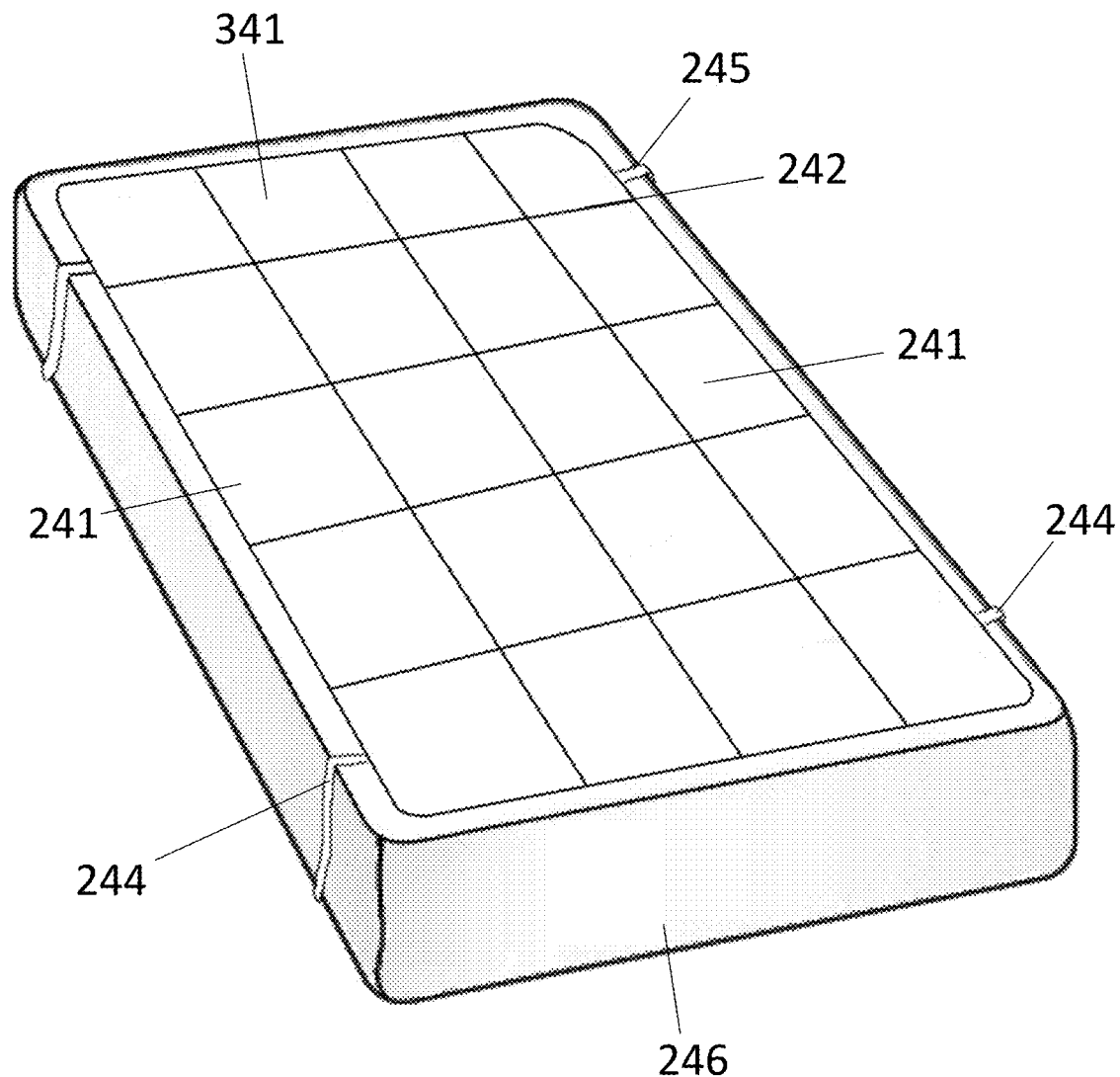
FIG. 5D illustrates a perspective view of a mattress topper on top of a mattress according to one embodiment of the present invention.

FIGS. 5B-D illustrate a mattress topper secured to a mattress. FIGS. 5B-2C illustrate one embodiment of the present invention wherein the mattress topper is incorporated into a cloth covering with an elastic border for securing the cloth covering coupled to the gel compartments of the mattress topper to the mattress. The compartments 231 are coupled together using a divider 232, The compartments 231 are also coupled to a cloth covering 234 which stretches around the mattress 235 to secure the mattress topper in place. The cloth covering 234 includes an elastic hem 236, which is visible in the cross sectional view of the mattress topper illustrated in FIG. 5C.

In one embodiment, the divider coupling the one or more compartments to the cloth covering is impermeable, while one or more dividers dividing the compartments are semi-permeable to water. In one embodiment, the one or more compartments are inserted into a cloth covering with a pocket configured to receive the one or more compartments. The compartments are not coupled to the cloth covering but are configured to be removed and replaced.

FIG. 5D illustrates one embodiment of the present invention wherein the mattress topper includes elastic coupling loops to secure the mattress topper to the mattress. The compartments 241 are coupled together using a divider 242. Elastic coupling loops 244, 245 connected to the compartments 241 and configured to stretch around the mattress 246 and secure the mattress topper in place.

In one embodiment, the mattress topper is placed on top of a mattress and covered using a cloth covering. In one embodiment, the mattress topper is coupled to the cloth covering, which is secured to the mattress (i.e., the support structure). Various means of securing the mattress topper to the mattress are operable to be used in the various embodiments of the present invention, including but not limited to elastic loop fasteners, hook-and-loop tape attachment, zippers, buttons, and buckles. In one embodiment, the mattress topper is inserted into a fitted sheet with an interior pocket configured to receive the mattress topper, and the fitted sheet is secured to the mattress. In one embodiment, the mattress topper includes two elastic coupling loops configured to fit around a lateral end of the mattress. In one embodiment, the mattress topper includes four elastic coupling loops configured to fit around a corner of the mattress.

Figure 6:
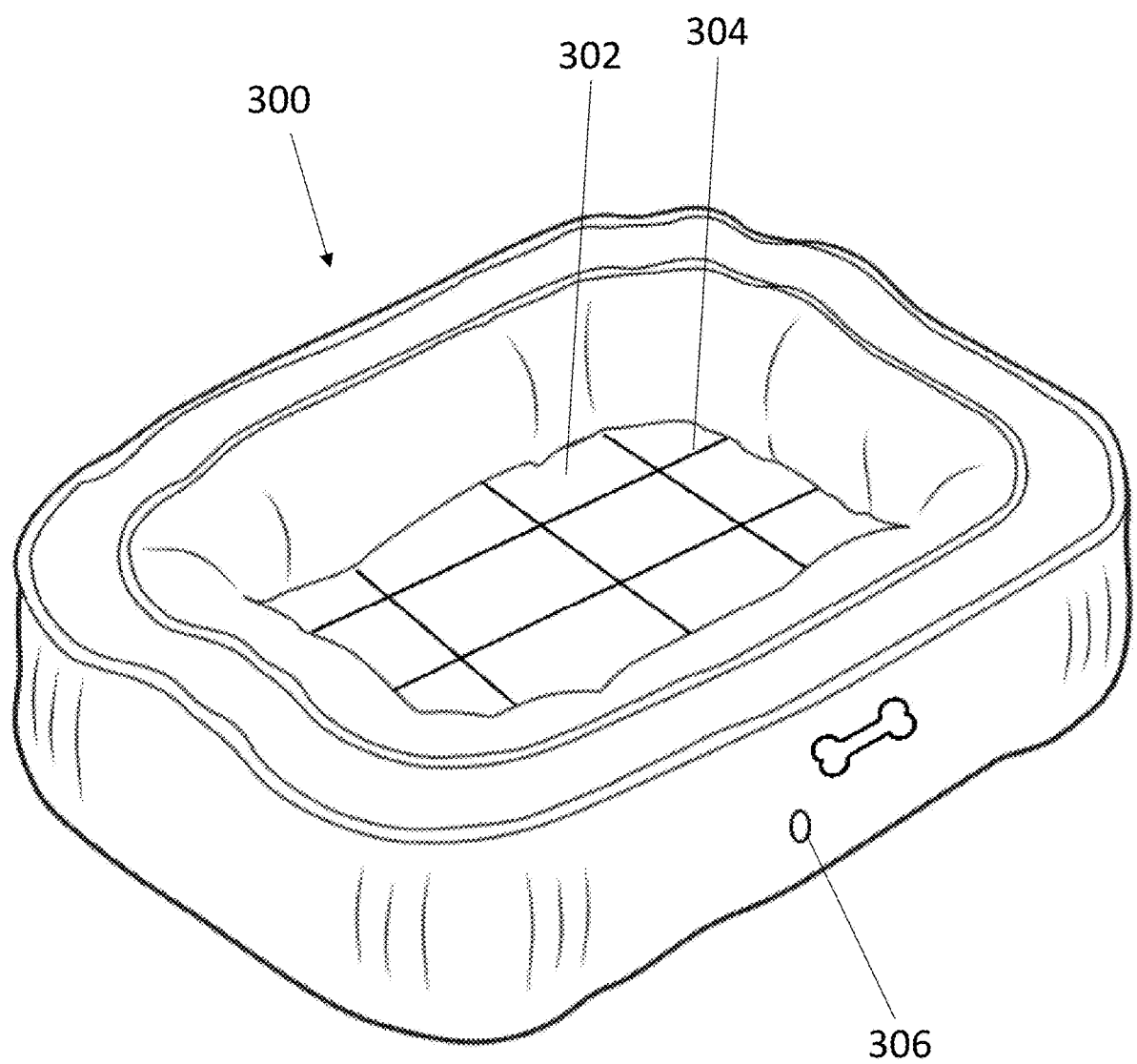
FIG. 6 illustrates a perspective view of an animal bed having a plurality of compartments according to one embodiment of the present invention.

FIG. 6 illustrates a perspective view of an animal bed having a plurality of compartments according to one embodiment of the present invention. In one embodiment, the teachings of the present invention are utilized in an animal bed 300 (e.g., a dog bed, a cat bed, etc.). In one embodiment, the animal bed includes a plurality of compartments 302 each including a plurality of gel beads, with the plurality of compartments being divided by a plurality of dividers 304. Preferably, the dividers 304 are size-selective as to the gel beads to prevent sloshing of the beads, but are permeable as to water in the system. In one embodiment, the animal bed 300 includes at least one valve 306 through which water is able to be pumped in and/or pumped out. In one embodiment, the gel beads are hydrated or swollen before the gel beads are sealed in the compartment or compartments, and there is no valve or other mechanism providing for addition or release of water from the compartment or compartments. In an alternative embodiment, the present invention includes just one containing element which includes the gel beads in the animal bed, and there are not separate compartments for an animal bed or an animal bed. The gel beads are also operable to be provided in an insert which fits into an animal bed or a topper which attaches to a top of an animal bed. In this manner, the layer including the gel beads is operable to be replaced or changed out. The component including at least one compartment with gel beads preferably includes a waterproof and durable (e.g., scratch and puncture resistant) layer on the top, sides, and/or bottom of the component including the at least one compartment. In one embodiment, this waterproof and durable layer includes a PVC layer. A comfort layer is operable to be provided on top of the PVC layer, such as a thin foam layer, a thin synthetic fur layer, a microfiber layer, or a shag layer.

Figure 7:
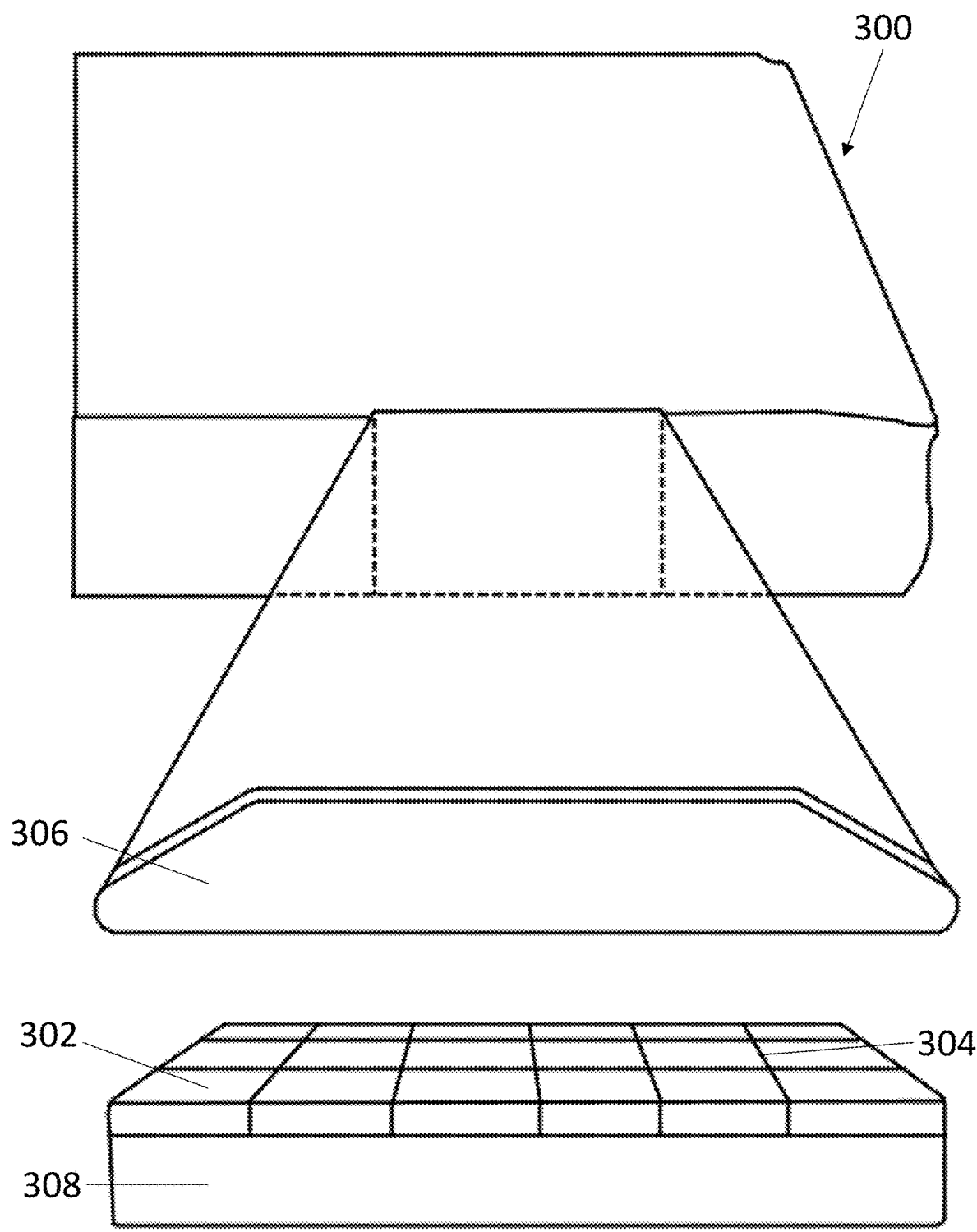
FIG. 7 illustrates a side view of layers of an animal bed according to one embodiment of the present invention.

FIG. 7 illustrates a side view of layers of an animal bed according to one embodiment of the present invention. In one embodiment, the animal bed 300 is covered with an outer gusset layer. In one embodiment, the outer gusset layer is formed from a durable coated poly-canvas material. In one embodiment, below the outer gusset layer is at least one waterproof layer 306. The gel cooling layer including the plurality of compartments 302 divided by the plurality of dividers 304 is beneath the at least one waterproof layer 306, with the at least one waterproof layer 306 helping to prevent potentially spilling of materials out of the animal bed 300. Finally, beneath the gel cooling layer is at least one support layer 308, providing the bulk stiffness of the animal bed 300. In one embodiment, the at least one support layer 308 includes at least one support foam layer. In one embodiment, the at least one support foam layer is a medical grade support foam layer.

Figure 8:
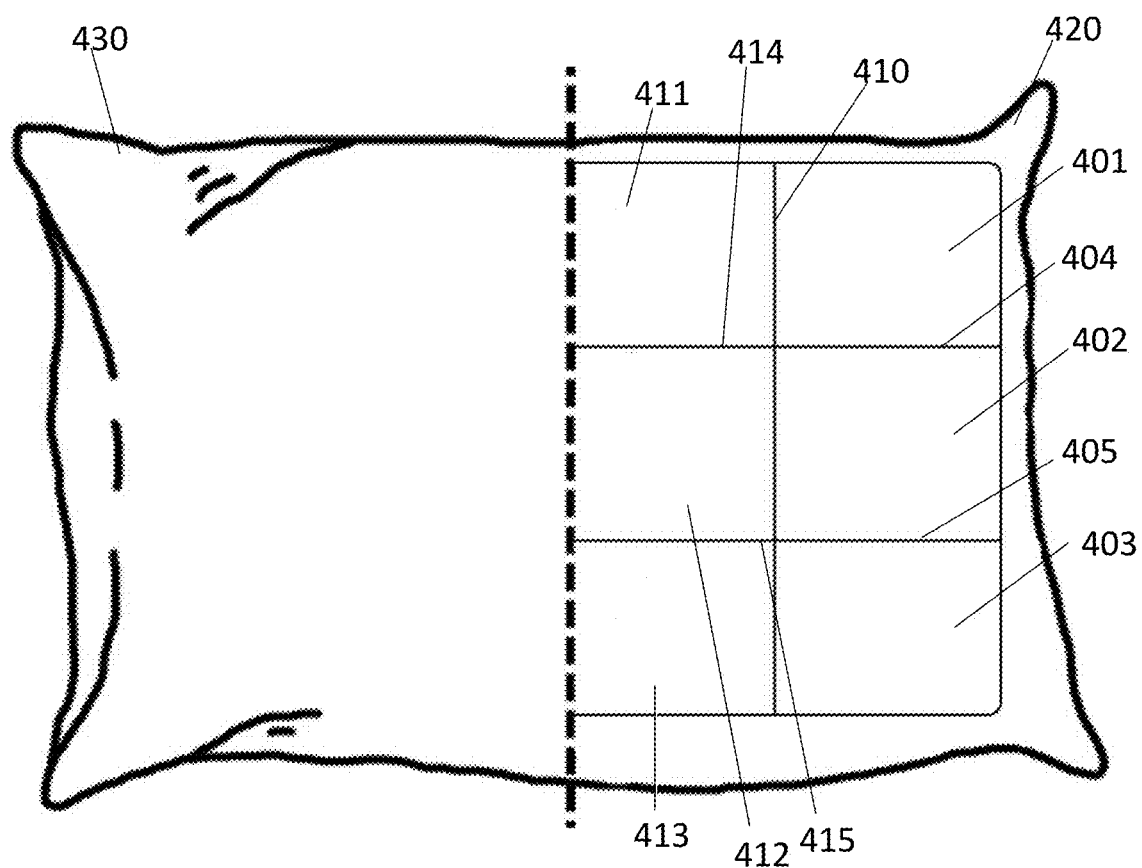
FIG. 8 illustrates a partial sectional view of a pillow with a pillow topper according to one embodiment of the present invention.
Figure 9:
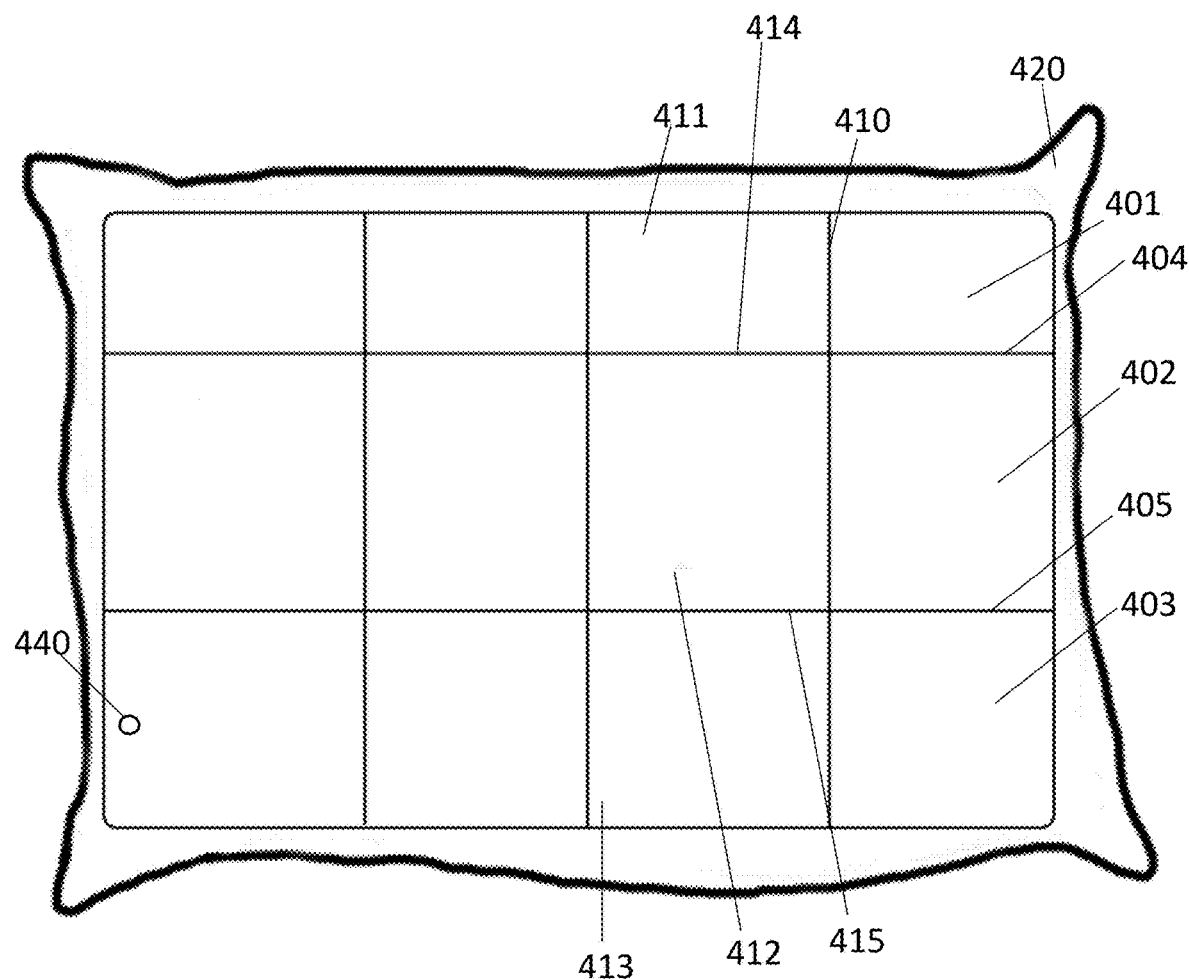
FIG. 9 illustrates a sectional view of a pillow with a pillow topper according to one embodiment of the present invention.

FIGS. 8 and 9 illustrate a pillow with a pillow topper according to one embodiment of the present invention. The compartments 401, 402, 403 of the pillow topper are connected via dividers 404, 405 (e.g., semi-permeable dividers). A divider 410 also connects another column of compartments 411, 412, 413 to the first column of compartments. The compartments of the additional column are connected via dividers 414, 415. The pillow topper comprising the compartments 401, 402, 403, 411, 412, 413 is placed on top of the support structure 420 of the pillow. The pillow topper is then operable to be enclosed with the support structure 420 by a cover 430. A valve 440 is connected to the topper and serves as a connection point for the water delivery system disclosed herein.

In one embodiment, adjacent compartments are connected using a combination of semi-permeable dividers and impermeable dividers. For example, the pillow topper of FIG. 9 is depicted with a single valve 440. However, in one embodiment, the pillow topper has multiple vales, each of which connect to a single subunit of compartments that are connected using semi-permeable dividers, and which are connected to another subunit of compartments via impermeable dividers. For example, one subunit of compartments (e.g., compartments 401, 402, 403) is connected via semi-permeable dividers (e.g., dividers 404, 405), and an adjacent column or subunit of compartments (e.g., compartments 411, 412, 413) are also connected via semi-permeable dividers (e.g., dividers 414, 415). However, the two subunits (i.e., the first subunit of compartments 401, 402, 403 and the second subunit of compartments 411, 412, 413) are connected via an impermeable divider (e.g., the divider 410). In this embodiment, each subunit would be connected to a valve (i.e., each compartment would be connected to a valve either directly or indirectly via one or more compartments with semi-permeable dividers).

Figure 10:
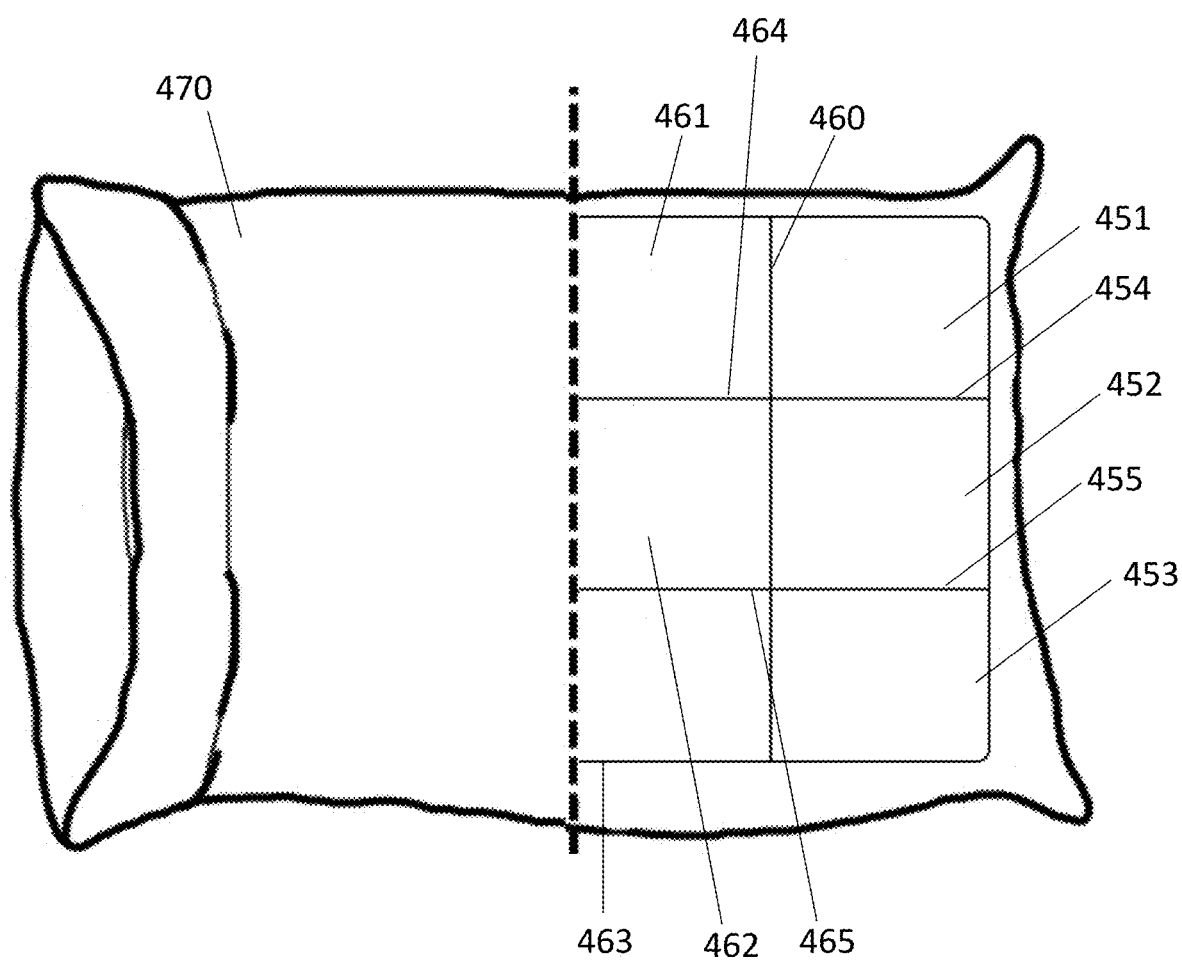
FIG. 10 illustrates a partial sectional view of a pillowcase with a pillow topper according to one embodiment of the present invention.

FIG. 10 illustrates a pillowcase with the pillow topper according to one embodiment of the present invention. The compartments 451, 452, 453 of the pillow topper are connected via dividers 454, 455 (e.g., semi-permeable dividers). A divider 460 also connects another column of compartments 461, 462, 463 to the first column of compartments. The compartments of the additional column are connected via dividers 464, 465. The pillow topper comprising the compartments 451, 452, 453, 461, 462, 463 is placed inside the pillowcase 470.

In one embodiment, the pillow topper is placed on top of a pillow and covered using a pillowcase. In one embodiment, the pillow topper is secured to the support structure, encased in a pillow covering to form a singular pillow, and then covered using a pillowcase. Various means of securing the pillow topper to the support structure are operable to be used in the various embodiments of the present invention, including but not limited to elastic loop fasteners, hook-and-loop tape attachment, zippers, buttons, and buckles. In one embodiment, the pillow topper is inserted into a pillowcase with an interior pocket configured to receive the pillow topper, and a pillow is inserted into the pillowcase.

In one embodiment, the compartments of the topper are comprised of a waterproof material. Examples of operable materials include but are not limited to polyvinyl chloride (PVC), silicone, polyurethane, latex, rubber, and polyethylene (e.g., high density polyethylene [HDPE]), and any combination thereof. In one embodiment, the compartments of the topper and/or the edges of each compartment are reinforced with drop stitch material and/or urethane foam to provide a firm and stable boundary and to prevent leaks. Furthermore, reinforcement helps to maintain a consistent shape and structure for the pillow topper if the pillow is adjusted.

In one embodiment, the pillow topper includes a plurality of compartments. Each compartment contains an amount of gel beads described herein. Upon contacting a fluid (e.g., water), the gel beads are configured to absorb the fluid and expand. The gel beads provide a pillow topper that cools the body due to the fluid absorbed by the beads, while eliminating the movement of the cooling layer that is common in the art. In one embodiment, 1 oz of unexpanded gel beads, when fully expanded, has a weight of about 110 oz. In one embodiment, 1 oz of unexpanded gel beads, when fully expanded, has a weight of between about 90 oz to 140 oz.

Figure 11:
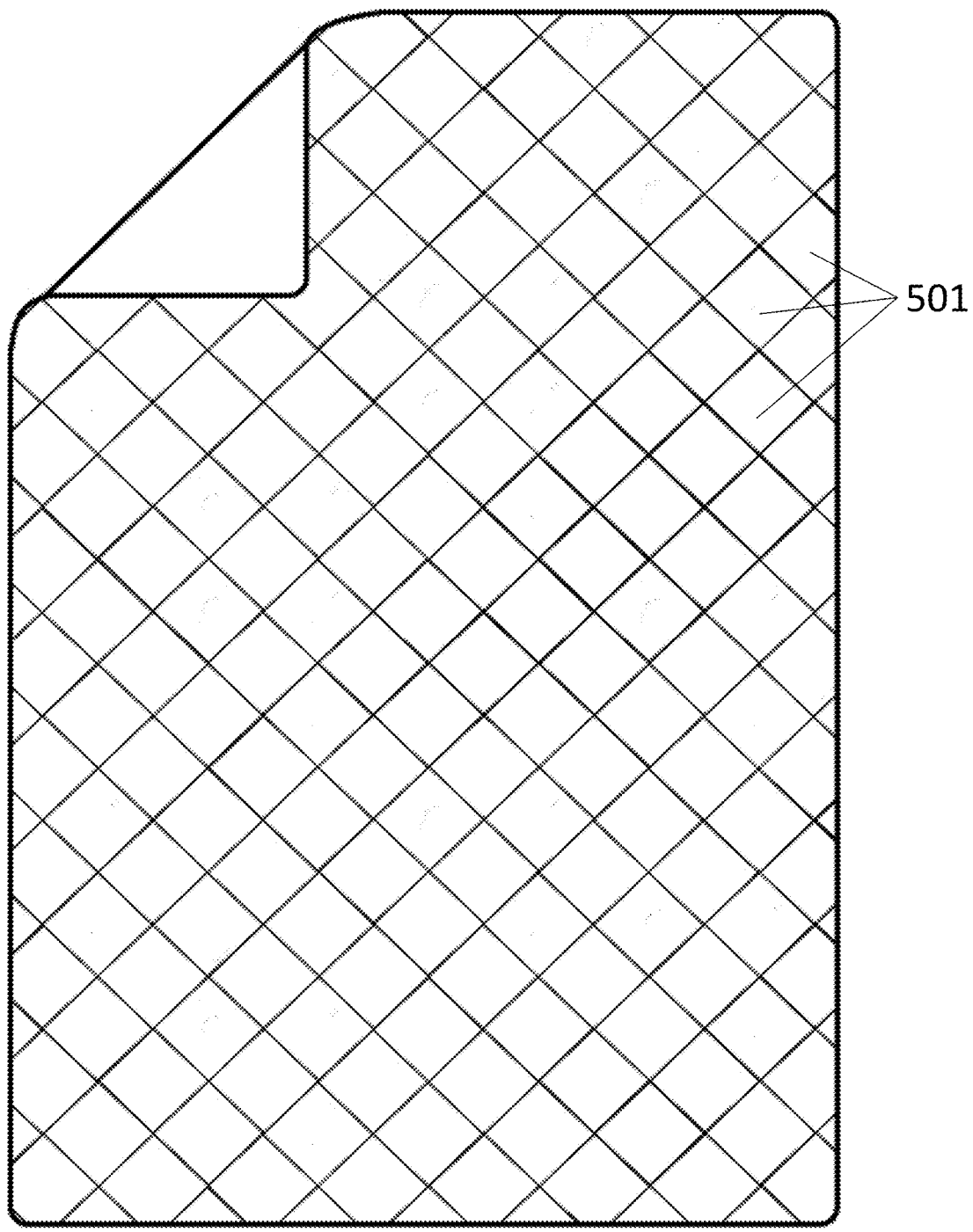
FIG. 11 illustrates a top orthogonal view of a blanket according to one embodiment of the present invention.

FIG. 11 illustrates a blanket according to one embodiment of the present invention. The compartments 501 contain the gel beads and, optionally, the weighted material disclosed herein.

Figure 12A:
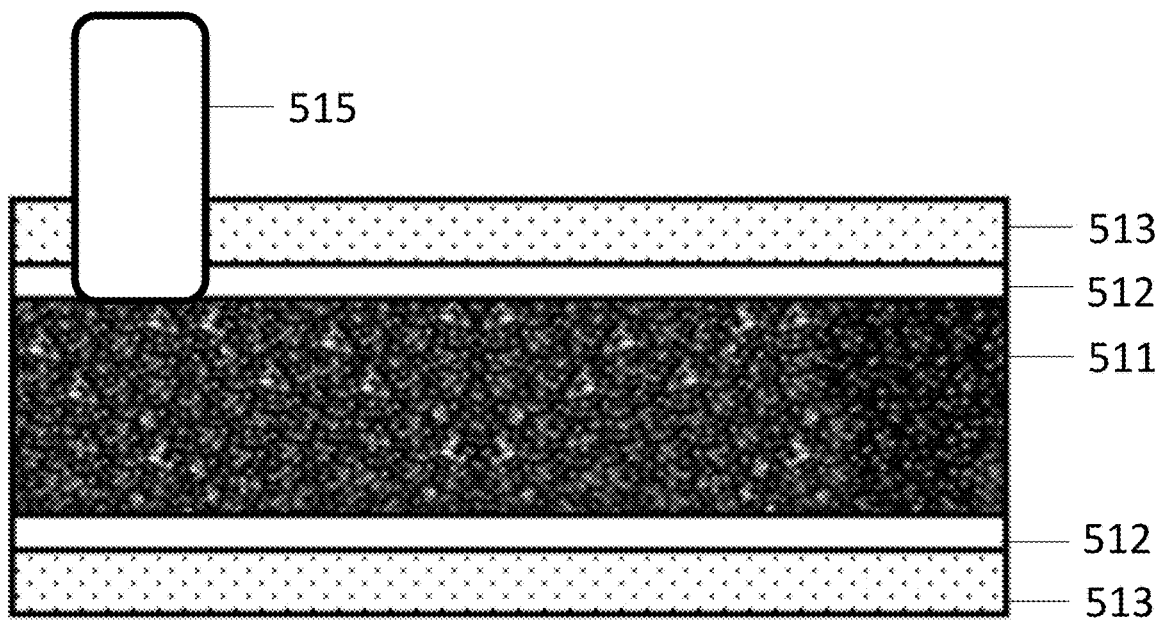
FIG. 12A illustrates a side cross sectional view of a weighted blanket of the present invention.
Figure 12B:
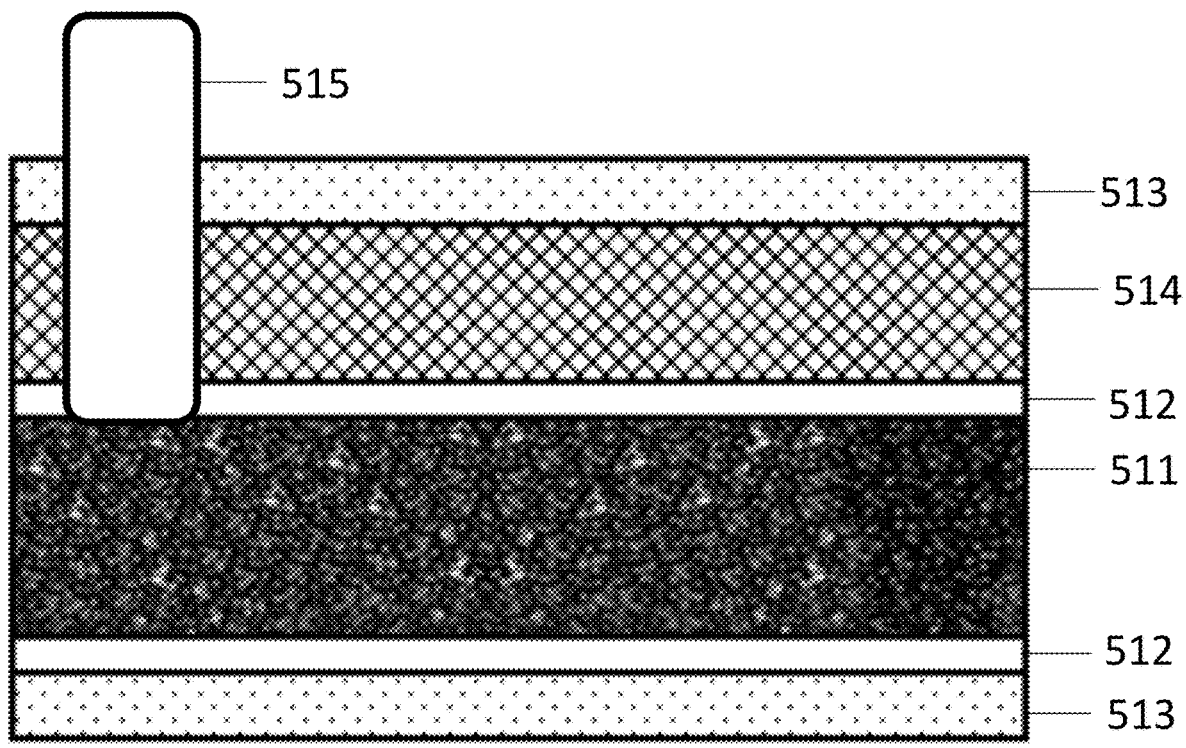
FIG. 12B illustrates a side cross sectional view of a weighted blanket of the present invention.

FIGS. 12A and 12B illustrate cross sectional views of a weighted blanket of the present invention. The weighted blanket comprises a gel layer 511 sandwiched between waterproof layers 512, with cloth layers 513 surrounding the interior layers of the weighted blanket. A valve 515 is coupled to a waterproof layer 512 and opens into the gel layer 511. FIG. 12A illustrates a cross sectional view of a weighted blanket wherein the weighted layer is the gel layer 511 of the present invention, while FIG. 12B illustrates a cross sectional view of a weighted blanket with a distinct gel layer 511 and a weighted layer 514 containing a weighted material.

Figure 13:
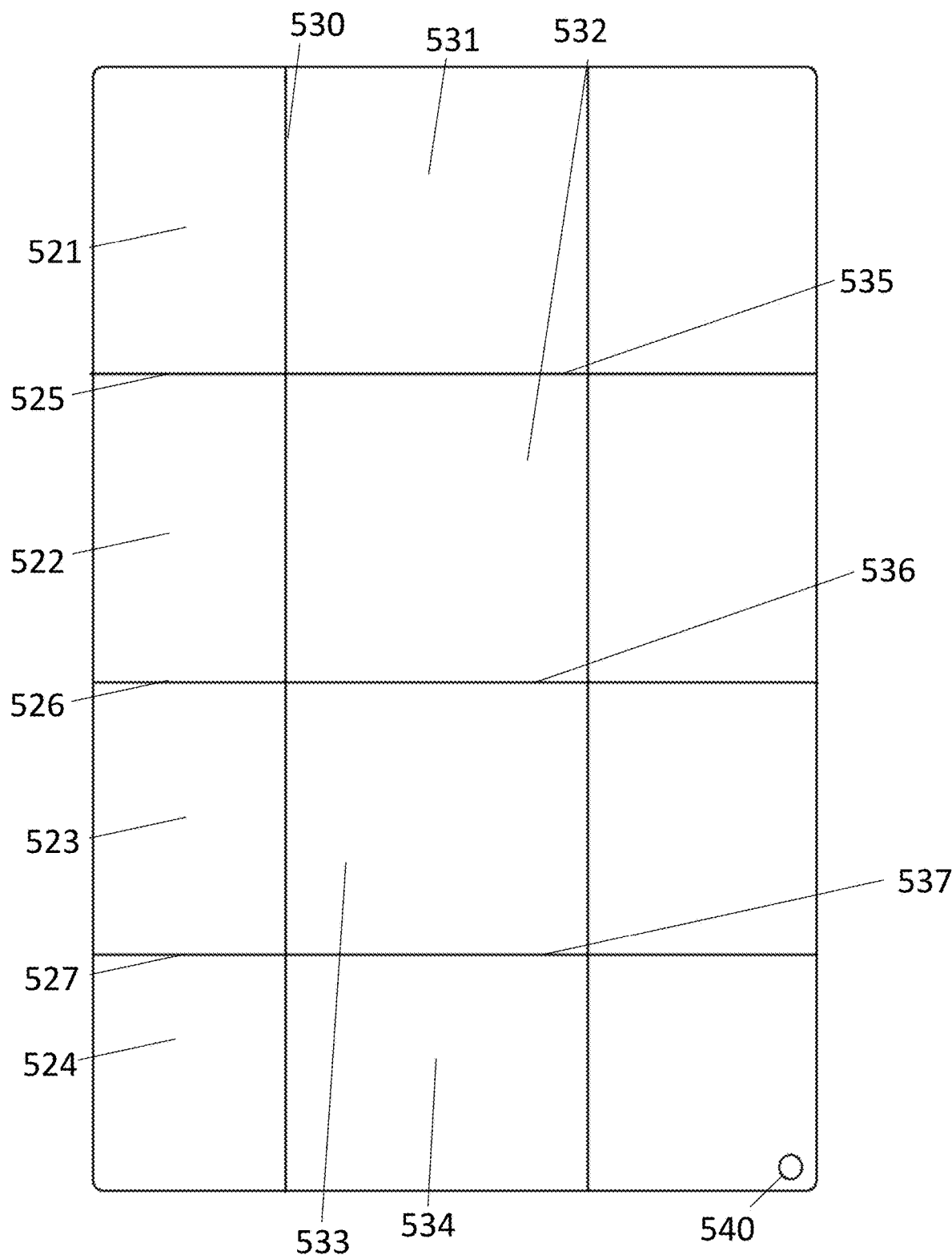
FIG. 13 illustrates a top view of a weighted blanket according to one embodiment of the present invention.

FIG. 13 illustrates a gel layer of a weighted blanket according to one embodiment of the present invention. The compartments 521, 522, 523, 524 of the gel layer are connected via dividers 525, 526, 527 (e.g., semi-permeable dividers). A divider 530 also connects another column of compartments 531, 532, 533, 534 to the first column of compartments. The compartments of the additional column are connected via dividers 535, 536, 537. A valve 540 is connected to a compartment 524 of the gel layer and serves as a connection point for the water delivery system disclosed herein.

In one embodiment, adjacent compartments are connected using a combination of semi-permeable dividers and impermeable dividers. For example, the gel layer of FIG. 3 is depicted with a single valve 540. However, in one embodiment, the gel layer has multiple vales, each of which connect to a single subunit of compartments that are connected using semi-permeable dividers, and which are connected to another subunit of compartments via impermeable dividers. For example, one subunit of compartments (e.g., compartments 521, 522, 523, 524) is connected via semi-permeable dividers (e.g., dividers 524, 525, 527), and an adjacent column or subunit of compartments (e.g., compartments 531, 532, 533, 534) are also connected via semi-permeable dividers (e.g., dividers 534, 535, 537). However, the two subunits (i.e., the first subunit of compartments 521, 522, 523, 524 and the second subunit of compartments 531, 532, 533, 534) are connected via an impermeable divider (e.g., the divider 530). In this embodiment, each subunit would be connected to a valve (i.e., each compartment would be connected to a valve either directly or indirectly via one or more compartments with semi-permeable dividers).

In one embodiment, the compartments of the gel layer of the weighted blanket are comprised of a waterproof material. Examples of operable materials include but are not limited to polyvinyl chloride (PVC), silicone, polyurethane, latex, rubber, and polyethylene (e.g., high density polyethylene [HDPE]), and any combination thereof. In one embodiment, the compartments of the gel and/or the edges of each compartment are reinforced with drop stitch material and/or urethane foam to provide a firm and stable boundary and to prevent leaks. Furthermore, reinforcement helps to maintain a consistent shape and structure for the weighted blanket of the blanket is adjusted.

In one embodiment, the weighted blanket includes a plurality of compartments. Each compartment contains an amount of gel beads described herein. Upon contacting a fluid (e.g., water), the gel beads are configured to absorb the fluid and expand. The gel beads provide a weighted blanket that cools the body due to the fluid absorbed by the beads. In one embodiment, 1 oz of unexpanded gel beads, when fully expanded, has a weight of about 110 oz. In one embodiment, 1 oz of unexpanded gel beads, when fully expanded, has a weight of between about 90 oz to 140 oz.

While the present invention utilizes passive cooling to provide comfort and health benefits to human and animal users, in one embodiment a heater is provided to maintain a minimum temperature of a component including the gel beads and fluid. Waterbed heaters are known in the art, and include mats or inserts such as those described in U.S. Pat. No. 5,022,108, which is incorporated herein by reference in its entirety. In one embodiment, the present invention does not require a heater and does not require electricity or power for operation. Alternatively, the only electricity or power required by the present invention includes the electricity or power provided for operation of a heater. In one embodiment, the minimum temperature of the component including the gel beads and fluid is between approximately 60 degrees Fahrenheit and approximately 70 degrees Fahrenheit, including but not limited to any specific temperature within this range. Additionally, or alternatively, in one embodiment, one or more Peltier chips (or other thermoelectric devices) is operable to heat and/or cool the insert (or other article) described herein. In one embodiment, the one or more Peltier chips is attached to or included in the insert (or other article), while in another embodiment, it is positioned on a separate device in contact with the insert (or other article). The one or more Peltier chips or one or more thermoelectric devices is operable to cool the fluid and the gel beads in the compartments to between approximately 60 degrees Fahrenheit and approximately 70 degrees Fahrenheit, including but not limited to any specific temperature within this range. In other embodiments, the heater, heating/cooling device, or a cooling device is operable to adjust the temperature to be a specific temperature or between a range of temperatures between approximately 60 degrees Fahrenheit and 110 degrees Fahrenheit.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. Although the term "water" is used in the present application, one of ordinary skill in the art understands that this term refers to any type of fluid suitable to cause gel beads or superabsorbent polymer to become swollen. The present invention is operable to include various ratios of water or fluid to gel beads by mass, weight, or volume, and all embodiments described include these ratios. For purposes of clarity, the present invention is operable to include anywhere between 0-100% water in the compartments and anywhere between 0 to 100% gel beads in the compartments, and any combination thereof. One of ordinary skill in the art understands the term "gel beads" to refer to any type of superabsorbent polymer of any shape suitable for the present application, with shapes including but not limited to cubes, rectangular prisms, spheres, and/or any polygon or irregular shape. The composition of the superabsorbent polymer includes any compositions referenced herein, as well as combinations of those compositions. All modifications and improvements have been deleted herein for the sake of conciseness and readability but are properly within the scope of the present invention.

The invention claimed is:
1. A bedding system, comprising:
an insert comprising a plurality of compartments;
a tubing system coupled to a water delivery system via a valve; and
a foam support structure;
wherein the insert is configured to be placed within the foam support structure;
wherein each of the plurality of compartments of the insert contains a plurality of gel beads;
wherein the plurality of compartments are coupled via dividers, wherein the plurality of gel beads do not traverse dividers;
wherein at least one compartment of the plurality of compartments is coupled to the tubing system;
wherein the tubing system is contained within the foam support structure, wherein the tubing system comprises a first end coupled to the valve and at least one end coupled to the at least one compartment;
wherein the valve is configured to be coupled to the water delivery system, wherein the tubing system is configured to deliver water from the valve to the at least one compartment; and
wherein the plurality of gel beads are configured to absorb the water and expand.

2. The system of claim 1, wherein the gel beads comprise a super absorbent polymer (SAP), wherein the SAP is sodium polyacrylate.

3. The system of claim 1, wherein an interior facing surface of each compartment of the plurality of compartments is infused and/or coated with at least one antimicrobial, anti-bacterial, or anti-fungal substance.

4. The system of claim 1, wherein the tubing system includes at least one additional valve, wherein the at least one additional valve is coupled to a vacuum system, wherein the vacuum system is configured to remove excess water from the plurality of compartments.

5. The system of claim 1, wherein the plurality of gel beads are configured to absorb water at a rate between about 2 mL/sec-10 mL/sec.

6. The system of claim 1, wherein dividers are size selective mesh dividers or plastic seams.

7. The system of claim 1, wherein the plurality of gel beads have a diameter of about 1 mm in an unexpanded state and a diameter between about 0.3 cm to about 0.5 cm in an expanded state.

8. The system of claim 1, wherein the plurality of gel beads have a diameter of about 2.5 mm in an unexpanded state and a diameter between about 0.9 cm to about 1.3 cm in an expanded state.

9. The system of claim 1, wherein the plurality of gel beads have a diameter of about 4 mm in an unexpanded state and a diameter between about 1.5 cm to about 2.0 cm in an expanded state.

10. The system of claim 1, wherein the plurality of compartments are shaped organically, wherein the organic shape of the plurality of compartments corresponds to a humanoid anatomical figure.

11. A method of creating a mattress insert, comprising:
filling a first compartment with gel beads and filling at least one additional compartment with gel beads;
coupling the first compartment to the at least one additional compartment, wherein the first compartment and the at least one additional compartment contain a plurality of gel beads;
dividers dividing the first compartment and the at least one additional compartment, wherein the dividers prevent the intercompartmental movement of gel beads;

connecting a tubing system to the first compartment via a tubing port, wherein the tubing port is configured to receive a first end of the tubing system;

feeding the tubing system through a foam support structure and coupling the tubing system to a valve port, the valve port comprises a valve protruding from an external surface of the foam support structure;

coupling a water delivery system to the valve, the valve delivering water to the tubing system via the valve port and the tubing system delivering the water to the first compartment;

the gel beads of the first compartment absorbing the water and expanding.

12. The method of claim 11, further comprising connecting the tubing system to the at least one additional compartment via an additional tubing port, wherein the additional tubing port is configured to receive an additional end of the tubing system.

13. The method of claim 11, further comprising the dividers preventing the intercompartmental movement of gel beads while allowing water to move freely between the first compartment and the at least one additional compartment.

14. The method of claim 11, further comprising coating or infusing an interior layer of the first compartment and the at least one additional compartment with at least one anti-microbial, anti-bacterial, or anti-fungal substance.

15. The method of claim 11, further comprising the gel beads comprising a super absorbent polymer (SAP), wherein the SAP is sodium polyacrylate.

16. A bedding system, comprising:

an insert comprising a plurality of compartments;

a tubing system coupled to a water delivery system via a valve; and a foam support structure;

wherein the insert is configured to be placed within the foam support structure;

wherein each of the plurality of compartments of the insert contains a plurality of gel beads;

wherein the plurality of compartments are coupled via dividers, wherein the dividers are semipermeable, and the plurality of gel beads do not traverse the dividers;

wherein at least one compartment of the plurality of compartments is coupled to the tubing system via a tubing port;

wherein the tubing system is contained within the foam support structure, wherein the tubing system comprises a first end coupled to the valve, at least one end coupled to the at least one compartment, and at least one additional end coupled to at least one additional compartment of the plurality of compartments;

wherein the valve is configured to be coupled to the water delivery system, wherein the tubing system is configured to deliver water from the valve to the at least one compartment;

wherein, upon delivery of the water to the at least one compartment, the water traverses the dividers and is dispersed through the plurality of compartments; and wherein the plurality of gel beads are configured to absorb the water and expand.

17. The system of claim 16, wherein the tubing port comprises a semipermeable covering, wherein water is delivered to the at least one compartment and movement of the plurality of gel beads from the at least one compartment into the tubing system is prevented.

18. The system of claim 16, wherein the gel beads comprise a super absorbent polymer (SAP), wherein the SAP is sodium polyacrylate.

19. The system of claim 16, wherein the plurality of gel beads are configured to absorb water at a rate between about 2 mL/sec-10 mL/sec.

20. The system of claim 16, wherein each of the plurality of compartments comprises polyvinyl chloride and/or urethane.

* * * * *